United States Patent
Shibuya

(10) Patent No.: US 8,744,354 B2
(45) Date of Patent: Jun. 3, 2014

(54) WIRELESS COMMUNICATION TERMINAL, WIRELESS COMMUNICATION METHOD, AND WIRELESS COMMUNICATION SYSTEM

(75) Inventor: Kazuyuki Shibuya, Sagamihara (JP)

(73) Assignee: Olympus Corporation, Tokyo (JP)

( * ) Notice: Subject to any disclaimer, the term of this patent is extended or adjusted under 35 U.S.C. 154(b) by 695 days.

(21) Appl. No.: 13/075,603

(22) Filed: Mar. 30, 2011

(65) Prior Publication Data

US 2011/0244897 A1 Oct. 6, 2011

(30) Foreign Application Priority Data

Apr. 1, 2010 (JP) .................................. 2010-085370

(51) Int. Cl.
  *H04B 7/00* (2006.01)
  *H04L 12/24* (2006.01)
(52) U.S. Cl.
  CPC ...................................... *H04L 41/22* (2013.01)
  USPC ..... 455/41.2; 455/41.1; 455/41.3; 455/550.1; 709/220; 709/221; 709/222; 709/225; 709/227
(58) Field of Classification Search
  USPC ............. 455/41.1–41.3, 550.1; 709/220–222, 709/225, 227–228
  See application file for complete search history.

(56) References Cited

U.S. PATENT DOCUMENTS

2011/0179180 A1* 7/2011 Schleifer et al. .............. 709/227
2011/0210816 A1* 9/2011 Wang ........................... 340/3.71

FOREIGN PATENT DOCUMENTS

JP 2010-068021 A 3/2010
JP 2010-068022 A 3/2010

OTHER PUBLICATIONS

Japanese Office Action dated Jun. 4, 2013, issued in corresponding Japanese Patent Application Number 2010-085370 with English translation (8 pages).
IEEE Standard for Information technology—Telecommunications and information exchange between systems—Local and metropolitan area networks—Specific requirements, Part 11: Wireless LAN Medium Access Control (MAC) and Physical Layer (PHL) Specifications, IEEE Computer Society, Sponsored by the LAN/MAN Standards Committee, IEEE Std. 802.11 (TM), 2007, ( https://standards.ieee.org/getieee802/downloaded/802.211-2007.pdf), Parts 1 thru 12.
Wi-Fi Protected Setup Specification, version 1.0h, Dec. 2006, (https://www.wi-fi.org/knowledge_center_overview.php?type=4.).

* cited by examiner

Primary Examiner — Fayyaz Alam
(74) Attorney, Agent, or Firm — Westerman, Hattori, Daniels & Adrian, LLP

(57) ABSTRACT

A wireless communication terminal includes a tentative determination unit for tentatively determining a role of a display terminal, a transmission unit for transmitting wireless data including information indicating the result of the tentative determination and first information on presence or absence of a display unit and an input unit of the wireless communication terminal, a receiving unit for receiving response data including information indicating a terminal as a display terminal and second information on presence or absence of a display unit and an input unit of a wireless communication terminal having received the wireless data, and a determination unit for determining the role of the display terminal based on the information indicating a terminal as the display terminal and the second information.

12 Claims, 16 Drawing Sheets

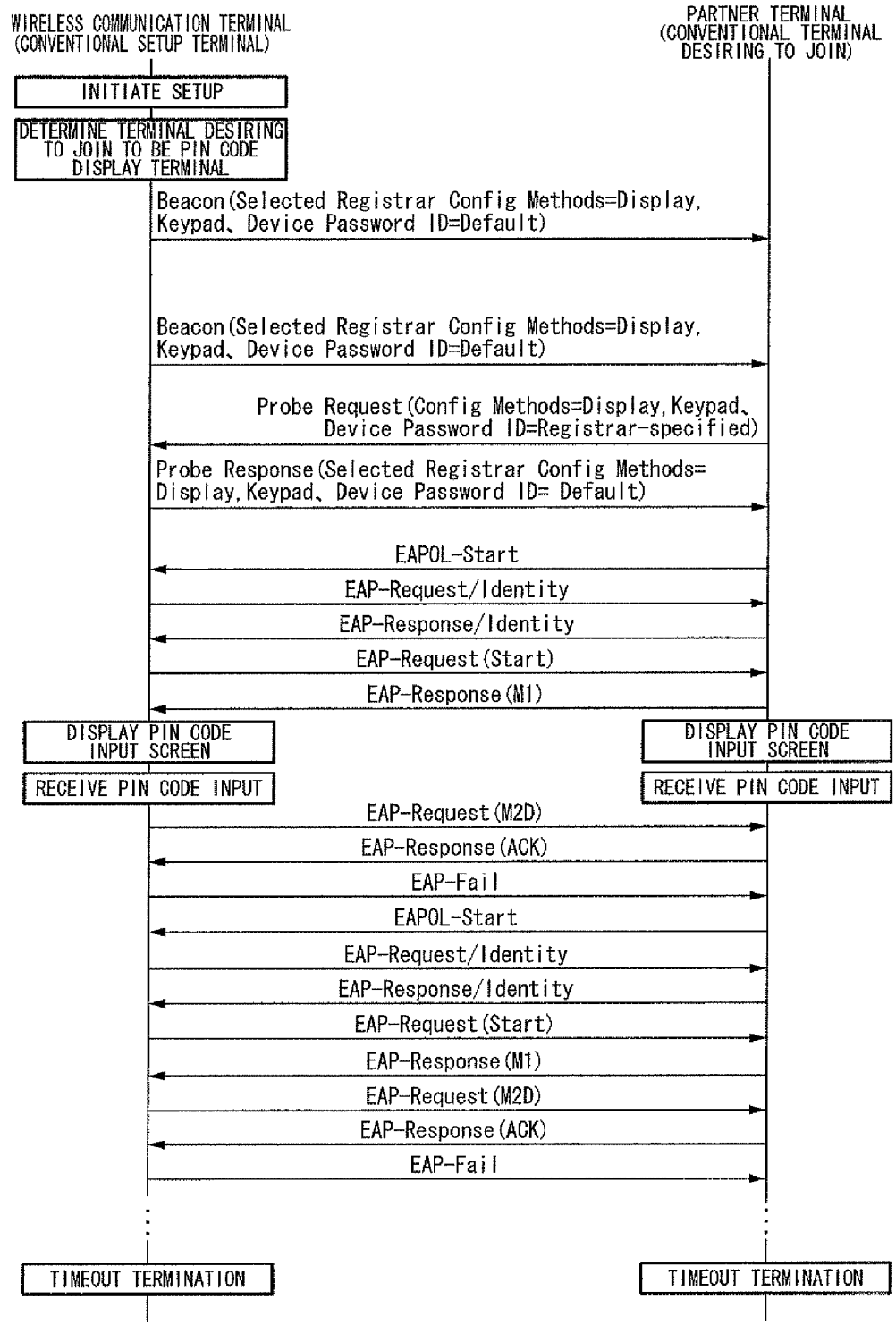

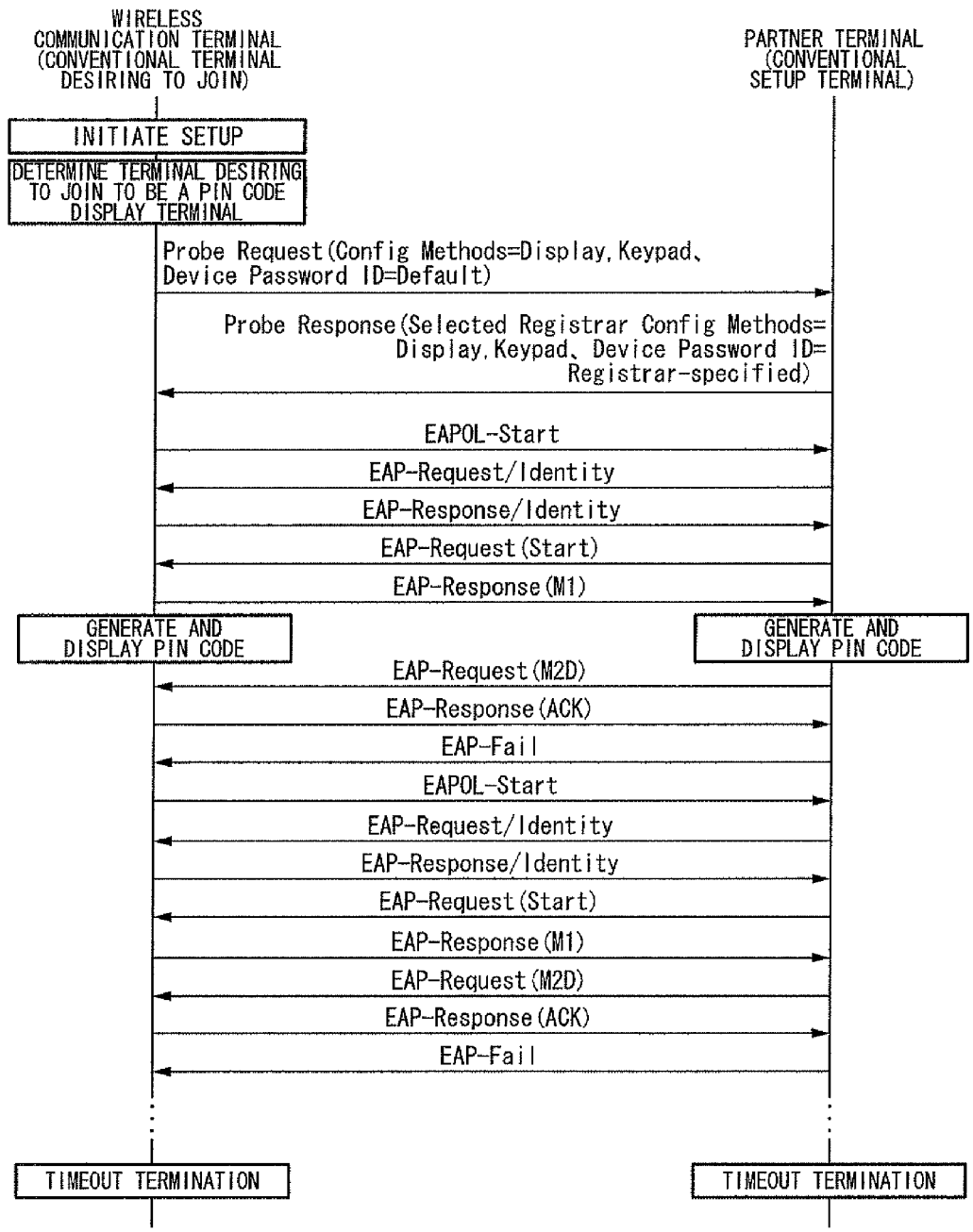

WIRELESS COMMUNICATION TERMINAL, WIRELESS COMMUNICATION METHOD, AND WIRELESS COMMUNICATION SYSTEM

FIELD OF THE INVENTION

The present invention relates to a wireless communication terminal, a wireless communication method, and a wireless communication system that determine a role of a display terminal for displaying identification information for an indication of a wireless network.

This application claims a priority based on Japanese Patent Application No. 2010-085370 filed on Apr. 1, 2010, the entire content of which is incorporated herein by reference.

BACKGROUND ART

In a conventional art, a communication terminal having a wireless LAN function needs to perform a wireless connection or a security setup to join a network (infrastructure network), which is provided via an access point (hereinafter, abbreviated as AP). This setup requires various settings to be input on the communication terminal. Since this input of the settings has been complex, it is particularly difficult for a user unfamiliar with wireless LAN technology to perform the setup.

To resolve this problem, Wi-Fi Protected Setup™ specification 1.0 (hereinafter, abbreviated as WPS) is disclosed as industrial standard technology of a wireless LAN for allowing a communication terminal to join an infrastructure network by simply performing a wireless connection or a security setup in Non-patent Document 1. Non-patent Document 1 is available, for example, from https://www.wi-fi.org/knowledge_center_overview.php?type=4.

Some setup methods are defined in the WPS, and a scheme using a PIN code that is identification information for an indication of a wireless network (hereinafter, abbreviated as PIN scheme) is defined as one of the methods. In the PIN scheme, the setup can be performed by inputting, to an AP, a PIN code that is displayed on an external terminal with a wireless LAN function desiring to join a network. The input of the PIN code to the AP may be performed, for example, by inputting the PIN code from a terminal in the network of the AP using a browser.

Meanwhile, in recent years, an ad hoc mode in which communication terminals directly perform wireless LAN communication with each other, unlike an infrastructure mode needing an AP, has begun to be introduced to portable terminals such as game machines or cameras. In the ad hoc mode, a central terminal, like the AP in the infrastructure mode, is not present in a network, and respective terminals perform communication on even ground. In Non-patent Document 2 disclosed as http://standards.ieee.org/getieee802/download/802.11-2007.pdf, a communication method in an infrastructure mode and an ad hoc mode is described.

In the ad hoc mode, a wireless connection or a security setup is complex as in the infrastructure mode, and it is desirable for a conventional WPS to be applied even to the ad hoc network to be run. Further, since respective terminals are on even ground, it is necessary to determine a terminal to display the PIN code or a terminal to input the PIN code when each terminal is capable of both displaying and inputting the PIN code.

DISCLOSURE OF THE INVENTION

An object of the present invention is to provide a wireless communication terminal, a wireless communication method, and a wireless communication system that are capable of reducing failure of a connection setup according to wireless communication by determining a role of a display terminal for displaying identification information for an indication of a wireless network.

According to a first aspect of the present invention, a wireless communication terminal includes a tentative determination unit for performing a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network; a transmission unit for transmitting wireless data, the wireless data including tentative display terminal information indicating the result of the tentative determination and first information on presence or absence of a display unit of the wireless communication terminal and presence or absence of an input unit of the wireless communication terminal; a receiving unit for receiving response data transmitted from other wireless communication terminal having received the wireless data, the response data including desired display terminal information indicating the terminal playing the role of the display terminal and second information on presence or absence of a display unit and an input unit of the other wireless communication terminal having received the wireless data; and a determination unit for determining which of the terminal desiring to join and the setup terminal plays the role of the display terminal based on the desired display terminal information and the second information.

In this case, the wireless communication terminal may be the terminal desiring to join, the transmission unit may transmit the wireless data to the setup terminal, and the receiving unit may receive the response data from the setup terminal.

Further, in this case, the wireless communication terminal may further include a display unit for performing display of information, wherein the display unit may display the identification information for an indication of the wireless network when the terminal playing the role of the display terminal determined by the determination unit is the wireless communication terminal.

Further, according to a second aspect of the present invention, a wireless communication terminal includes a receiving unit for receiving wireless data, the wireless data including tentative display terminal information indicating the result of a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit; a determination unit for determining which of the terminal desiring to join and the setup terminal plays the role of the display terminal based on the tentative display terminal information and the first information; and a transmission unit for transmitting response data to other wireless communication terminal having transmitted the wireless data, the response data including desired display terminal information indicating the determined terminal playing the role of the display terminal and second information on presence or absence of a display unit of the wireless communication terminal and presence or absence of an input unit of the wireless communication terminal.

In this case, the wireless communication terminal may be the setup terminal, the receiving unit may receive the wireless data from the terminal desiring to join, and the transmission unit may transmit the response data to the terminal desiring to join.

Further, in this case, the wireless communication terminal may further include a display unit for performing display of information, wherein the display unit may display the identification information for an indication of the wireless network when the terminal playing the role of the display terminal determined by the determination unit is the wireless communication terminal.

Further, according to a third aspect of the present invention, a wireless communication terminal includes a receiving unit for receiving first wireless data from a terminal desiring to join a wireless network, the first wireless data including tentative display terminal information indicating the result of a tentative determination as to which of the terminal desiring to join and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit of the terminal desiring to join, and receiving second wireless data including second information on presence or absence of a display unit and an input unit of the setup terminal from the setup terminal; a determination unit for determining which of the terminal desiring to join and the setup terminal plays the role of the display terminal based on the tentative display terminal information and the first information; and a transmission unit for transmitting response data including desired display terminal information indicating the determined terminal playing the role of the display terminal and the second information to the terminal desiring to join, and transmitting notification data including the desired display terminal information to the setup terminal.

Further, according to a fourth aspect of the present invention, a wireless communication method includes a tentative determination step of performing a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network; a transmission step of transmitting wireless data, the wireless data including tentative display terminal information indicating the result of the tentative determination and first information on presence or absence of a display unit of the wireless communication terminal and presence or absence of an input unit of the wireless communication terminal; a receiving step of receiving response data transmitted from other wireless communication terminal having received the wireless data, the response data including desired display terminal information indicating the terminal playing the role of the display terminal and second information on presence or absence of a display unit and an input unit of the other wireless communication terminal having received the wireless data; and a determination step of determining which of the terminal desiring to join and the setup terminal plays the role of the display terminal based on the desired display terminal information and the second information.

Further, according to a fifth aspect of the present invention, a wireless communication method includes a receiving step of receiving wireless data, the wireless data including tentative display terminal information indicating the result of a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit; a determination step of determining which of the terminal desiring to join and the setup terminal plays the role of the display terminal based on the tentative display terminal information and the first information; and a transmission step of transmitting response data to other wireless communication terminal having transmitted the wireless data, the response data including desired display terminal information indicating the determined terminal playing the role of the display terminal and second information on the presence or absence of a display unit of the wireless communication terminal and the presence or absence of an input unit of the wireless communication terminal.

Further, according to a sixth aspect of the present invention, a wireless communication method includes a receiving step of receiving first wireless data from a terminal desiring to join a wireless network, the first wireless data including tentative display terminal information indicating the result of a tentative determination as to which of the terminal desiring to join and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit of the terminal desiring to join, and receiving second wireless data including second information on presence or absence of a display unit and an input unit of the setup terminal from the setup terminal; a determination step of determining which of the terminal desiring to join and the setup terminal plays the role of the display terminal based on the tentative display terminal information and the first information; and a transmission step of transmitting response data to the terminal desiring to join, the response data including desired display terminal information indicating the determined terminal playing the role of the display terminal and the second information, and transmitting notification data including the desired display terminal information to the setup terminal.

Further, according to a seventh aspect of the present invention, a wireless communication system includes a first wireless communication terminal and a second wireless communication terminal that perform wireless communication, wherein the first wireless communication terminal includes: a tentative determination unit for performing a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network; a first transmission unit for transmitting wireless data, the wireless data including tentative display terminal information indicating the result of the tentative determination and first information on presence or absence of a display unit of the first wireless communication terminal and presence or absence of an input unit of the first wireless communication terminal; a first receiving unit for receiving response data transmitted from the second wireless communication terminal having received the wireless data, the response data including desired display terminal information indicating the terminal playing the role of the display terminal and second information on presence or absence of a display unit and an input unit of the second wireless communication terminal having received the wireless data; and a first determination unit for determining which of the terminal desiring to join and the setup terminal plays the role of the display terminal based on the desired display terminal information and the second information, and the second wireless communication terminal includes: a second receiving unit for receiving the wireless data; a second determination unit for determining which of the terminal desiring to join and the setup terminal plays the role of the display terminal based on the tentative display terminal information and the first information; and a second transmission unit for transmitting response data to the first wireless communication terminal, the response data including desired display terminal information indicating the determined terminal playing the role of the display terminal and the second information on presence or absence of a display unit of the second wireless communication terminal and presence or absence of an input unit of the second wireless communication terminal.

Further, according to an eighth aspect of the present invention, a wireless communication system includes a terminal desiring to join a wireless network, a setup terminal that is a partner with which the terminal desiring to join performs a connection setup to join the wireless network, and a joining terminal that has joined the wireless network and is different from the setup terminal, wherein the terminal desiring to join includes: a tentative determination unit for performing a tentative determination as to which of the terminal desiring to join and the setup terminal plays a role of a display terminal for displaying identification information for an indication of the wireless network; a first transmission unit for transmitting first wireless data, the first wireless data including tentative display terminal information indicating the result of the tentative determination and first information on presence or absence of a display unit of the terminal desiring to join and presence or absence of an input unit of the terminal desiring to join; a first receiving unit for receiving response data transmitted from the joining terminal, the response data including desired display terminal information indicating the terminal playing the role of the display terminal and second information on presence or absence of a display unit and an input unit of the setup terminal having received the first wireless data; and a first determination unit for determining which of the terminal desiring to join and the setup terminal plays the role of the display terminal based on the desired display terminal information and the second information, the joining terminal includes: a second receiving unit for receiving the first wireless data from the terminal desiring to join and receiving second wireless data including the second information from the setup terminal; a second determination unit for determining which of the terminal desiring to join and the setup terminal plays the role of the display terminal based on the tentative display terminal information and the first information; and a second transmission unit for transmitting response data including the desired display terminal information indicating the determined terminal playing the role of the display terminal and the second information to the terminal desiring to join, and transmitting notification data including the desired display terminal information to the setup terminal, and the setup terminal includes: a third transmission unit for transmitting the second wireless data; and a third receiving unit for receiving the notification data.

BRIEF DESCRIPTION OF THE DRAWINGS

FIG. 16 is a sequence diagram showing operation of a conventional setup terminal.

FIG. 17 is a sequence diagram showing operation of a conventional terminal desiring to join.

PREFERRED EMBODIMENTS

Hereinafter, embodiments of the present invention will be described with reference to the accompanying drawings.

First Embodiment

Figure 1:
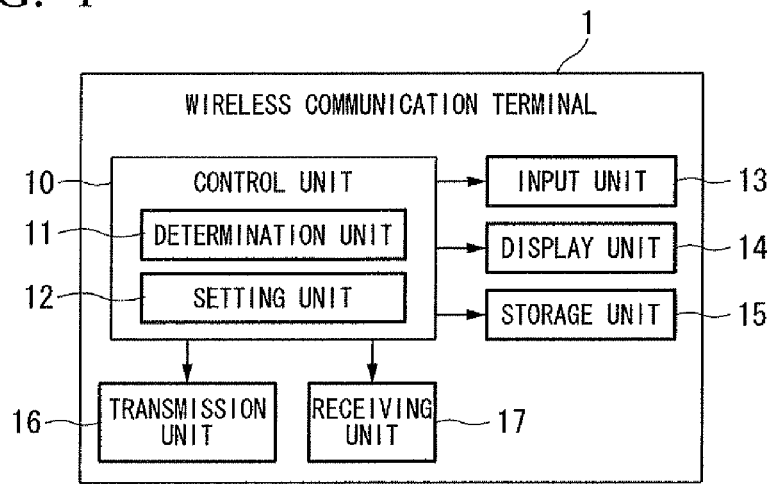
FIG. 1 is a block diagram showing a configuration of a wireless communication terminal according to a first embodiment of the present invention.

First, a first embodiment of the present invention will be described. FIG. 1 shows a configuration of a wireless communication terminal according to the present embodiment. A wireless communication terminal 1 shown in FIG. 1 includes a control unit 10, an input unit 13, a display unit 14, a storage unit 15, a transmission unit 16, and a receiving unit 17.

The control unit 10 includes a determination unit 11 and a setting unit 12, and performs various controls according to wireless communication. The determination unit 11 performs a process of determining a wireless communication terminal playing a role of a terminal for displaying a PIN code, which is identification information for an indication of a wireless network. The setting unit 12 generates the PIN code and sets an encryption scheme, an encryption key and the like, which are necessary when forming an ad hoc network with other wireless communication terminals.

The input unit 13 includes a full keyboard, ten keys or cross keys, OK/cancel buttons, and the like used for a user to input information to the wireless communication terminal 1. In the present embodiment, it is assumed that the user inputs the PIN code using the input unit 13. The display unit 14 displays various information, such as a state of the wireless communication terminal 1 or the PIN code. The storage unit 15 stores various information, such as the state of the wireless communication terminal 1. The transmission unit 16 transmits information to the other wireless communication terminals through wireless communication. The receiving unit 17 receives information from the other wireless communication terminals by the wireless communication.

Figure 2:
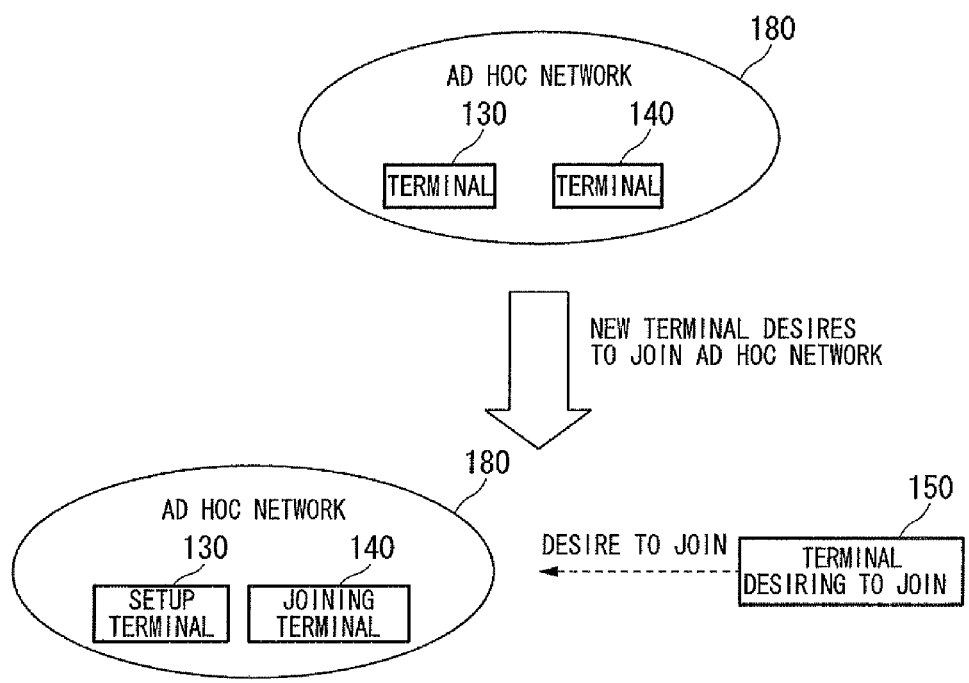
FIG. 2 is a block diagram showing a configuration of a wireless communication system according to the first embodiment of the present invention.

FIG. 2 shows a state in which a new wireless communication terminal joins an ad hoc network.

A terminal 130 and a terminal 140 join an ad hoc network 180. The terminal 130 operates as a setup terminal and the terminal 140 operates as a joining terminal. A terminal desiring to join 150 desires to join the ad hoc network 180 joined by the two terminals.

The setup terminal, the joining terminal, and the terminal desiring to join in this disclosure are as follows: A terminal belonging to the ad hoc network operates as the setup terminal when a setup application is initiated. The terminal belonging to the ad hoc network operates as the joining terminal when the setup application is not initiated.

Meanwhile, when the setup application is initiated, a terminal not belonging to the ad hoc network first initiates operation as the setup terminal and searches for a terminal desiring to join. When the terminal does not find the terminal desiring to join within a given period after initiating the operation as the setup terminal, the terminal stops the operation as the setup terminal, initiates operation as the terminal desiring to join, and searches for the setup terminal or the joining terminal. When the terminal can find neither the setup terminal nor the joining terminal within a given period after initiating the operation as the terminal desiring to join, the terminal stops the operation as the terminal desiring to join and initiates the operation as the setup terminal again. Then, the terminal iteratively performs operations as the setup terminal and as the terminal desiring to join until finding the terminal.

Figure 6:
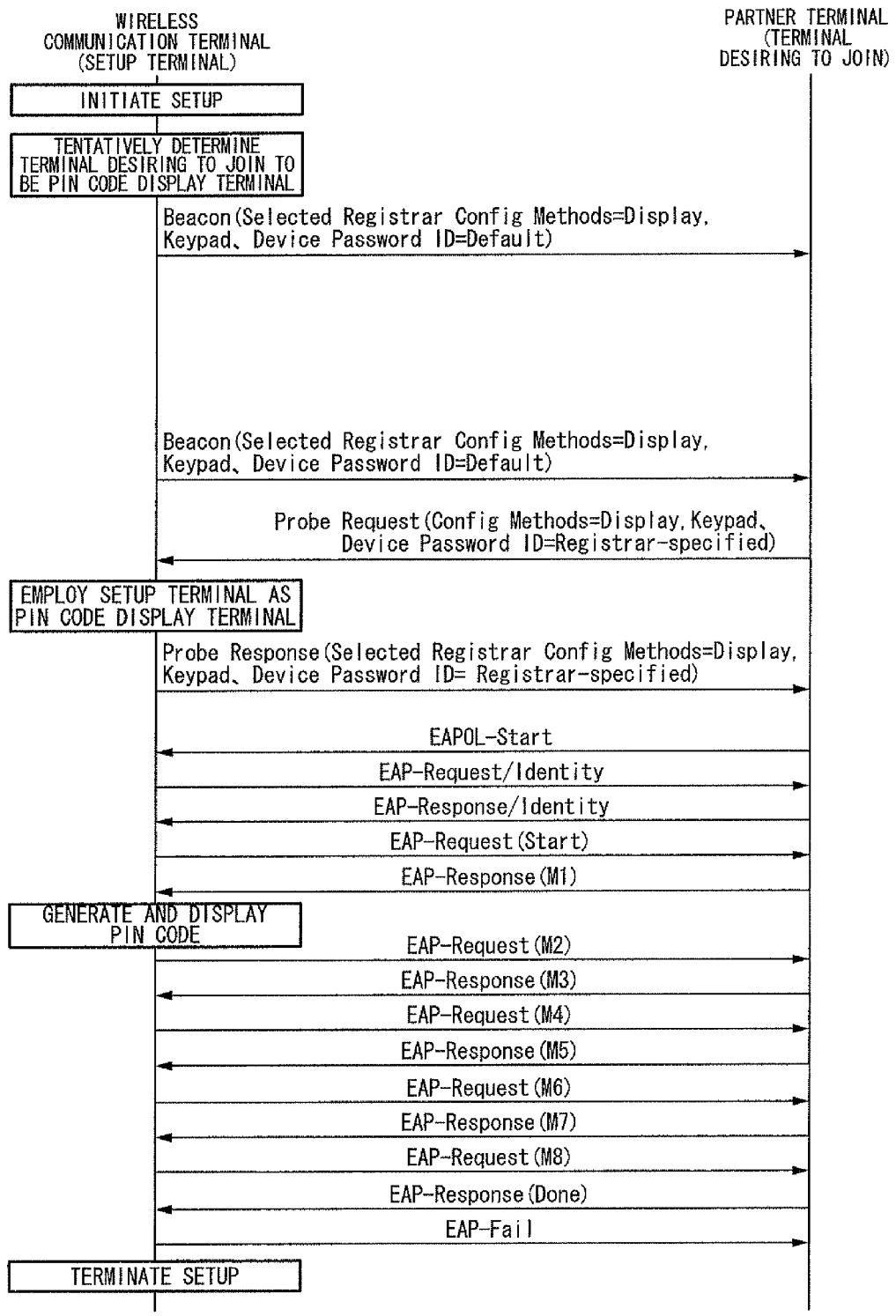
FIG. 6 is a sequence diagram showing operation of a setup terminal according to the first embodiment of the present invention.

Further, when registration to safely transmit wireless and security information about a network to which the setup terminal belongs from the setup terminal to the terminal desiring to join using an Extensible Authentication Protocol (EAP) message is completed (e.g., EAP message exchange until M8 is completed and the process ends with EAP-fail, as shown in FIG. 6), the terminal desiring to join and the setup terminal terminate their roles.

In the PIN scheme of the present embodiment, one of a terminal belonging to the ad hoc network and a terminal not belonging to the ad hoc network and desiring to join the ad hoc network becomes a PIN code display terminal, and the other becomes a PIN code input terminal. Setup is automatically performed by the user inputting a PIN code displayed by the display terminal to the input terminal.

Figure 3:
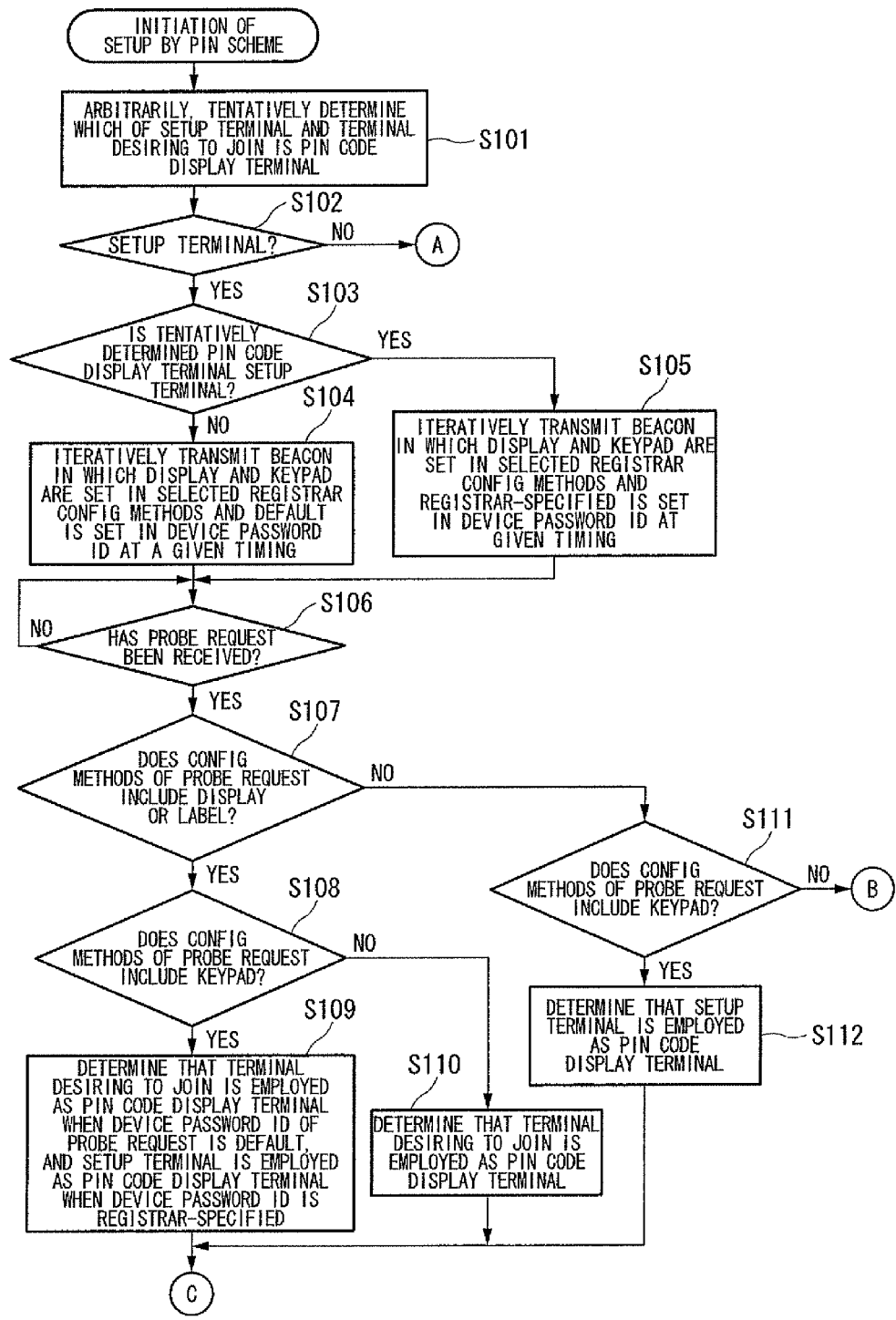
FIG. 3 is a flowchart showing a procedure of operation of the wireless communication terminal according to the first embodiment of the present invention.
Figure 4:
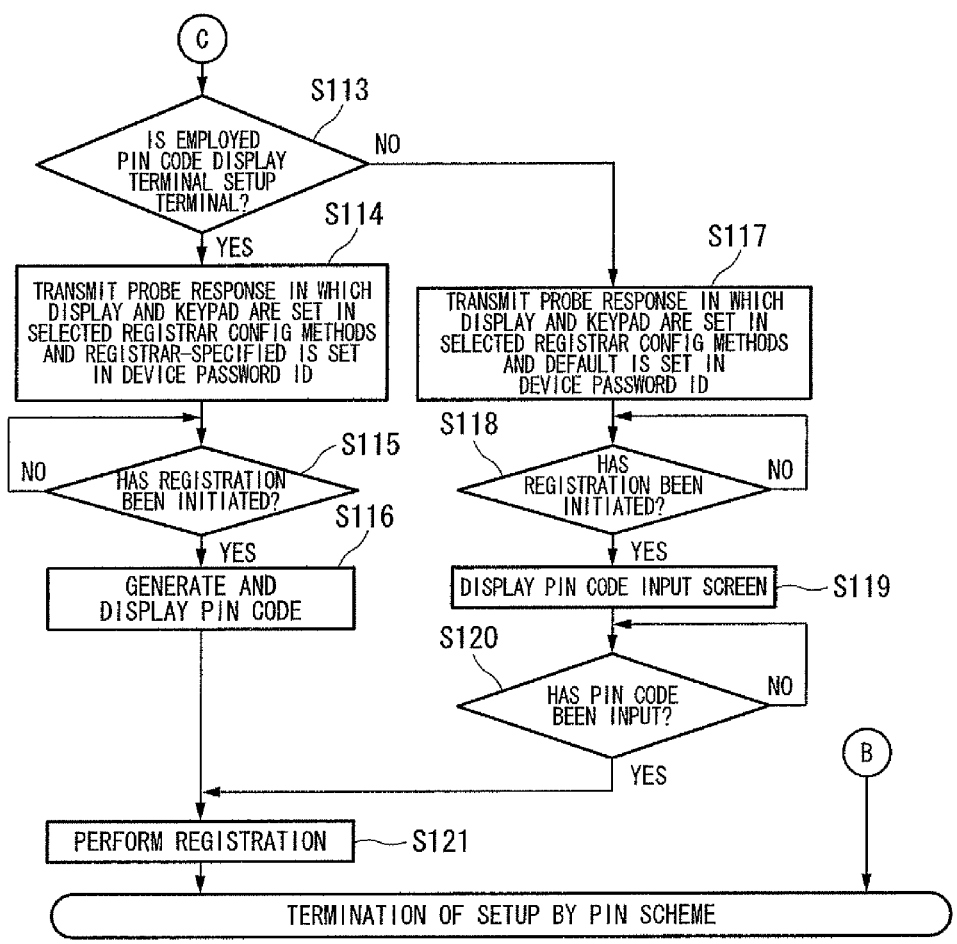
FIG. 4 is a flowchart showing a procedure of operation of the wireless communication terminal according to the first embodiment of the present invention.

FIGS. 3 and 4 show a setup procedure according to a PIN scheme, and mainly show an operation procedure of a setup terminal. An overview of the procedure shown in FIGS. 3 and 4 is as follows:

(1) It is tentatively determined which of a setup terminal and a terminal desiring to join plays a role of the display terminal for displaying the PIN code.

(2) Values according to content of the tentative determination are set in a beacon, which is iteratively transmitted.

(3) When a probe request transmitted from the terminal desiring to join is received and the terminal desiring to join is capable of both displaying and inputting the PIN code, either the setup terminal or the terminal desiring to join is employed as a PIN code display terminal according to a value of the Device Password ID included in the probe request.

(4) A probe response is transmitted to a terminal desiring to join according to the content of employment.

(5) Generation and display of the PIN code or reception of a PIN code input is performed according to the content of employment.

Hereinafter, FIGS. 3 and 4 will be described in detail. Further, a setup terminal operating according to a procedure shown in FIGS. 3 and 4 is the wireless communication terminal 1 shown in FIG. 1.

First, the determination unit 11 tentatively determines which of a setup terminal (Registrar) and a terminal desiring to join (Enrollee) plays a role of a PIN code display terminal, and records the result of the tentative determination in the storage unit 15 (step S101).

As a method of tentatively determining the PIN code display terminal in step S101, various methods may be used as described below. In addition, the following methods may be used even when the PIN code display terminal is tentatively determined in other steps.

A PIN code display terminal is determined in consideration of display capability (e.g., resolution or color number of an LCD) or input capability (e.g., a full keyboard, ten keys or cross keys, or only OK/cancel buttons) of the wireless communication terminal 1. One terminal becomes the display terminal when the display capability of the one terminal is high and a partner terminal becomes the display terminal when the input capability of the one terminal is high.

One terminal is always a display terminal. Alternatively, a partner terminal is always a display terminal A display terminal is determined at random based on a random number generated by a CPU.

When a frame such as beacon or probe request is received, a display terminal is determined by comparing a size of a media access control (MAC) address of a transmission source terminal notified of by the frame with a size of a MAC address of a receiving terminal. For example, the terminal having a greater MAC address becomes the display terminal.

When a frame such as beacon or probe request is received, a display terminal is determined based on a value of the Device Password ID included in the frame.

The determination unit 11 then determines whether the wireless communication terminal 1 is the setup terminal (step S102). Information for identifying whether the wireless communication terminal 1 is a setup terminal, a joining terminal, or a terminal desiring to join is stored in the storage unit 15, and the determination is performed based on this information in step S102. When the wireless communication terminal 1 was not the setup terminal, the process proceeds to step S130 in FIG. 5. When the wireless communication terminal 1 was the setup terminal, the determination unit 11 determines whether the terminal playing a role of the display terminal tentatively determined in step S101 is the setup terminal (step S103).

When the terminal playing a role of the display terminal is not the setup terminal, the transmission unit 16 iteratively transmits a beacon in which "Display" and "Keypad" are set in Selected Registrar Config Methods and "Default" is set in Device Password ID at a given timing (step S104). When the terminal playing a role of the display terminal is the setup terminal, the transmission unit 16 iteratively transmits a beacon in which "Display" and "Keypad" are set in Selected Registrar Config Methods and "Registrar-specified" is set in Device Password ID at a given timing (step S105).

The Selected Registrar Config Methods indicate a setup method supported by a terminal that was the setup terminal "Display" indicates that a terminal has a display function capable of displaying a PIN code, and "Label" indicates that the PIN code is attached to a terminal, for example, using a seal. "Keypad" indicates that a terminal has an interface capable of inputting the PIN code. The Device Password ID indicates a PIN code used during a registration operation. "Default" indicates that a PIN code of the Enrollee is used, and "Registrar-specified" indicates that a PIN code of the Registrar is used. The Selected Registrar Config Methods and the Device Password ID are described in Non-patent Document 1 in detail.

The beacon is a message that is continuously transmitted by respective devices of an ad hoc network, sequentially and alternately, according to a given procedure. The beacon is described in Non-patent Document 2 in detail.

The determination unit 11 then determines whether a probe request has been received (step S106). When the probe request has not been received, a process of step S106 is performed again. When the probe request has been received, the determination unit 11 determines whether "Display" or "Label" (first information) is included in the Config Methods of the probe request (step S107). This determination is a determination as to display capability of a terminal desiring to join which has transmitted the probe request. The Config Methods indicates a setup method supported by the terminal having transmitted the probe request. The Config Methods has a value, like the Selected Registrar Config Methods.

When "Display" or "Label" is included in the Config Methods, the determination unit 11 determines whether "Keypad" (first information) is included in the Config Methods (step S108). This determination is a determination regarding input capability of the terminal desiring to join which has transmitted the probe request.

When "Keypad" is included in the Config Methods, the determination unit 11 determines that the terminal desiring to join is employed as a PIN code display terminal when the Device Password ID in the probe request is "Default" (tentative display terminal information), and the setup terminal is employed as a PIN code display terminal when the Device Password ID is "Registrar-specified" (tentative display terminal information), and records the result of the determination in the storage unit 15 (step S109). When "Keypad" is not included in the Config Methods, the determination unit 11 determines that the terminal desiring to join is employed as a PIN code display terminal, and records the result of the determination in the storage unit 15 (step S110).

In step S107, when neither "Display" nor "Label" is included in the Config Methods of the probe request, the determination unit 11 determines whether "Keypad" (the first information) is included in the Config Methods (step S111). This determination is a determination regarding the input capability of the terminal desiring to join which has transmitted the probe request.

When "Keypad" is included in the Config Methods, the determination unit 11 determines that the setup terminal is employed as a PIN code display terminal, and records the result of the determination in the storage unit 15 (step S112). When "Keypad" is not included in the Config Methods, the process is terminated.

In steps S107 to S112, the determination unit 11 determines a terminal playing the role of the display terminal based on the information of a terminal desired to be a PIN code display terminal by the terminal desiring to join or the information of the display and input capabilities of the terminal desiring to join. In step S109, since it is determined in steps S107 and S108 that the display and input capabilities of the terminal desiring to join are sufficient, either the setup terminal or the terminal desiring to join may be the display terminal. Thereby, a terminal desired to be a PIN code display terminal by the terminal desiring to join is employed as a display terminal by the Device Password ID.

In step S110, since it is determined in steps S107 and S108 that the display capability of the terminal desiring to join is sufficient but the input capability is not sufficient, the terminal desiring to join is employed as a PIN code display terminal, and the setup terminal becomes a PIN code input terminal. In step S112, since it is determined in steps S107 and S111 that the display capability of the terminal desiring to join is not sufficient but the input capability is sufficient, the setup terminal is employed as a PIN code display terminal and the terminal desiring to join becomes a PIN code input terminal.

Subsequent to steps S109, S110 and S112, the determination unit 11 determines whether the PIN code display terminal employed in any of steps S109, S110 and S112 is the setup terminal (step S113). When the employed PIN code display terminal is the setup terminal, the transmission unit 16 transmits a probe response in which "Display" and "Keypad" (second information) are set in Selected Registrar Config Methods and "Registrar-specified" (desired display terminal information) is set in Device Password ID, to the terminal desiring to join as the probe request transmission source (step S114). Accordingly, the terminal desiring to join is notified that the setup terminal is determined to be the PIN code display terminal.

The determination unit 11 then determines whether registration has been initiated (step S115). The registration is a process of safely transmitting wireless and security information about a network to which the setup terminal belongs, from the setup terminal to the terminal desiring to join using an EAP message. The registration is described in Non-patent Document 1 in detail. The initiation of the registration may be an initiation of the registration by transmission or reception of an EAP-Response (M1), EAPOL-Start or EAP-Request (Start), or may be an initiation of the registration at other timings.

When the registration has not been initiated, the determination in step S115 is performed again. When the registration has been initiated, the setting unit 12 generates a PIN code and displays the PIN code on the display unit 14 (step S116). For the PIN code, an 8-digit number is mainly used. A method of generating the PIN code is described in Non-patent Document 1. The setting unit 12 then transmits and receives various messages to and from the terminal desiring to join via the transmission unit 16 and the receiving unit 17 to perform registration according to the setup of wireless communication (step S121). For example, information of an encryption key exchanged through the registration is recorded in the storage unit 15. When the registration is terminated, the setup is terminated.

When, in step S113, the employed PIN code display terminal is not the setup terminal, the transmission unit 16 transmits a probe response in which "Display" and "Keypad" (second information) are set in Selected Registrar Config Methods and "Default" (desired display terminal information) is set in Device Password ID, to the terminal desiring to join as the probe request transmission source (step S117).

Accordingly, the terminal desiring to join is notified that the terminal desiring to join is determined to be the PIN code display terminal.

The determination unit 11 then determines whether the registration has been initiated (step S118). When the registration has not been initiated, the determination in step S118 is performed again. When the registration has been initiated, the setting unit 12 displays a PIN code input screen on the display unit 14 (step S119).

The setting unit 12 waits for the PIN code to be input and determines whether the PIN code has been input (step S120). When the PIN code has not been input, the determination in step S120 is performed again. When the PIN code has been input, the setting unit 12 transmits and receives various messages to and from the terminal desiring to join via the transmission unit 16 and the receiving unit 17 to perform registration according to setup of wireless communication (step S121). For example, information of an encryption key exchanged through the registration is recorded in the storage unit 15. When the registration is terminated, the setup is terminated.

Figure 5:
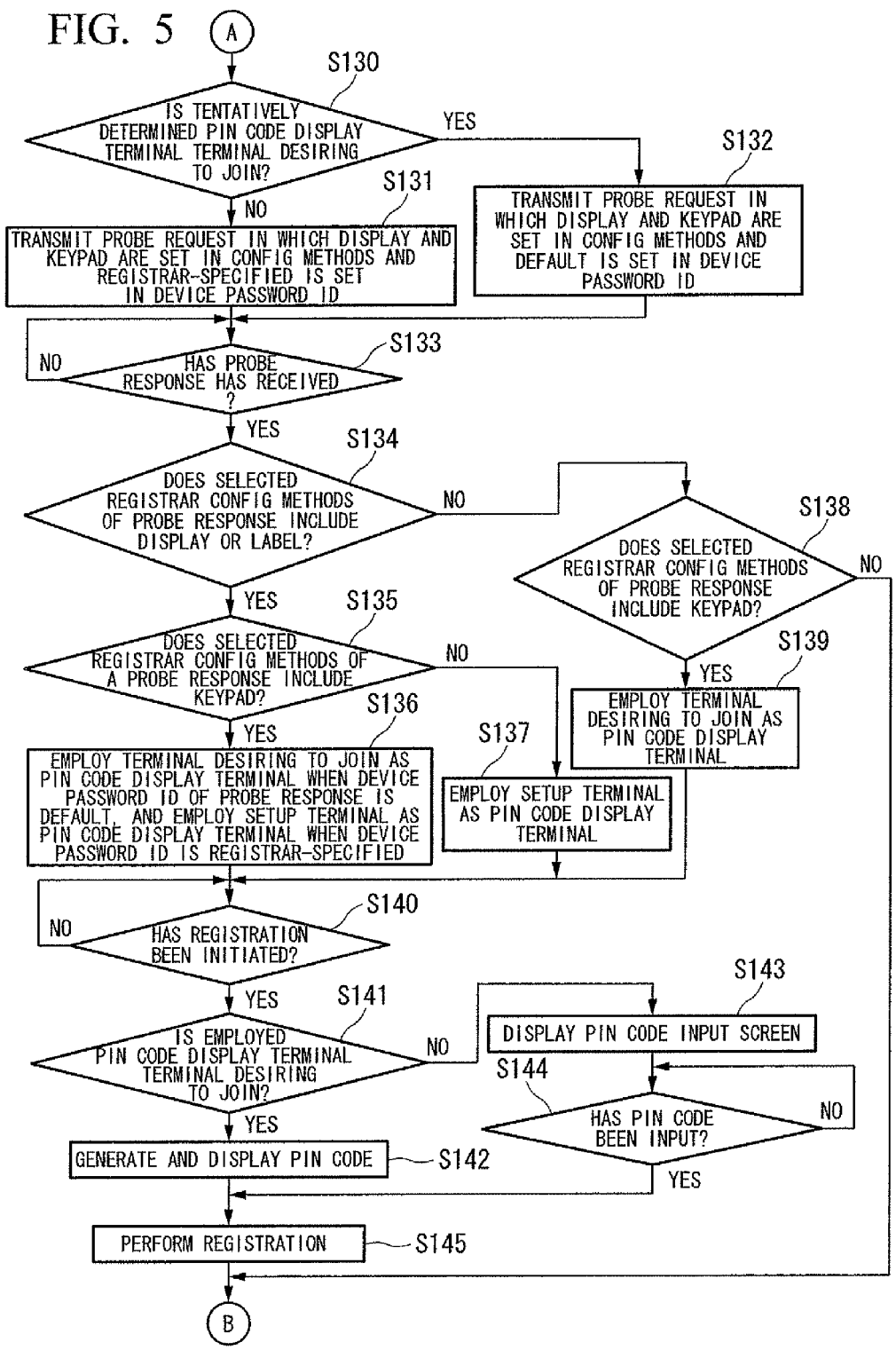
FIG. 5 is a flowchart showing a procedure of operation of the wireless communication terminal according to the first embodiment of the present invention.

FIG. 5 shows a setup procedure by a PIN scheme and mainly shows an operation procedure of the terminal desiring to join. An overview of the procedure shown in FIG. 5 is as follows:

(1) It is tentatively determined which of the setup terminal and the terminal desiring to join plays a role of a display terminal for displaying the PIN code.

(2) Values according to content of the tentative determination are set in a probe request, which is then transmitted.

(3) A probe response transmitted from the setup terminal is received, and when the setup terminal is capable of displaying or inputting a PIN code, any one of the setup terminal and the terminal desiring to join is employed as a PIN code display terminal according to the value of the Device Password ID included in the probe response.

(4) Generation and display of the PIN code or reception of a PIN code input is performed according to the content of employment.

Hereinafter, FIG. 5 will be described in detail. Further, the terminal desiring to join operating according to the procedure shown in FIG. 5 is the wireless communication terminal 1 shown in FIG. 1.

The determination unit 11 determines whether the terminal playing a role of the display terminal tentatively determined in step S101 is a terminal desiring to join (step S130). When the terminal playing a role of the display terminal is not a terminal desiring to join, the transmission unit 16 transmits a probe request in which "Display" and "Keypad" (first information) are set in Config Methods and "Registrar-specified" (tentative display terminal information) is set in Device Password ID (step S131). The probe request is broadcast, for example, to all terminals in a radio range, but may be transmitted to all terminals in a specific network or may be transmitted to a specific terminal. When the terminal playing a role of the display terminal is a terminal desiring to join, the transmission unit 16 transmits a probe request in which "Display" and "Keypad" (first information) are set in Config Methods and "Default" (tentative display terminal information) is set in Device Password ID (step S132).

The determination unit 11 then determines whether a probe response has been received (step S133). When the probe response has not been received, the process in step S133 is performed again. When the probe response has been received, the determination unit 11 determines whether "Display" or "Label" (second information) is included in the Selected Registrar Config Methods in the probe response (step S134). This determination is a determination regarding the display capability of the setup terminal having transmitted the probe response.

When "Display" or "Label" is included in the Selected Registrar Config Methods, the determination unit 11 determines whether "Keypad" (second information) is included in the Selected Registrar Config Methods (step S135). This determination is a determination regarding input capability of the setup terminal having transmitted the probe response.

When "Keypad" is included in the Selected Registrar Config Methods, the determination unit 11 determines that the terminal desiring to join is employed as a PIN code display terminal when the Device Password ID in the probe response is "Default" (desired display terminal information), and the setup terminal is employed as a PIN code display terminal when the Device Password ID is "Registrar-specified" (desired display terminal information), and records the result of the determination in the storage unit 15 (step S136). When "Keypad" is not included in the Selected Registrar Config Methods, the determination unit 11 determines that the setup terminal is employed as a PIN code display terminal, and records the result of the determination in the storage unit 15 (step S137).

In step S134, when neither "Display" nor "Label" is included in the Selected Registrar Config Methods in the probe response, the determination unit 11 determines whether "Keypad" (the second information) is included in the Selected Registrar Config Methods (step S138). This determination is a determination regarding input capability of the setup terminal having transmitted the probe response.

When "Keypad" is included in the Selected Registrar Config Methods, the determination unit 11 determines that the terminal desiring to join is employed as a PIN code display terminal, and records the result of the determination in the storage unit 15 (step S139). When "Keypad" is not included in the Selected Registrar Config Methods, the process is terminated.

In steps S134 to S139, the determination unit 11 determines the terminal playing a role of the display terminal based on the information of a terminal desired to be a PIN code display terminal by the setup terminal or the information of the display and input capabilities of the setup terminal. In step S136, since it is determined in steps S134 and S135 that the display and input capabilities of the setup terminal are sufficient, either the setup terminal or the terminal desiring to join may be a display terminal. Thereby, the terminal desired to be the PIN code display terminal by the setup terminal is employed as a display terminal by the Device Password ID.

In step S137, since it is determined in steps S134 and S135 that the display capability of the setup terminal is sufficient but the input capability is not sufficient, the setup terminal is employed as a PIN code display terminal, and the terminal desiring to join becomes a PIN code input terminal. In step S139, since it is determined in steps S134 and S138 that the display capability of the setup terminal is not sufficient but the input capability is sufficient, the terminal desiring to join is employed as a PIN code display terminal and the setup terminal becomes a PIN code input terminal.

Subsequent to steps S136, S137 and S139, the determination unit 11 determines whether registration has been initiated (step S140). When the registration has not been initiated, the determination in step S140 is performed again. When the registration has been initiated, the determination unit 11 determines whether the PIN code display terminal employed in any of steps S136, S137 and S139 is the terminal desiring to join (step S141).

When the employed PIN code display terminal is the terminal desiring to join, the setting unit 12 generates the PIN code and displays the PIN code on the display unit 14 (step S142). The setting unit 12 then transmits and receives various messages to and from the terminal desiring to join via the transmission unit 16 and the receiving unit 17 to perform registration according to setup of wireless communication (step S145). For example, information of an encryption key exchanged through the registration is recorded in the storage unit 15. When the registration is terminated, the setup is terminated.

When, in step S141, the employed PIN code display terminal is not the terminal desiring to join, the setting unit 12 displays a PIN code input screen on the display unit 14 (step S143). The setting unit 12 waits for the PIN code to be input and determines whether the PIN code has been input (step S144). When the PIN code has not been input, the determination in step S144 is performed again. When the PIN code has been input, the setting unit 12 transmits and receives various messages to and from the terminal desiring to join via the transmission unit 16 and the receiving unit 17 to perform registration according to setup of wireless communication (step S145). For example, information of an encryption key exchanged through the registration is recorded in the storage unit 15. When the registration is terminated, the setup is terminated.

FIG. 6 shows an example of operation of the setup terminal. When setup is initiated, the setup terminal, for example, tentatively determines the terminal desiring to join to be a PIN code display terminal (corresponding to step S101). Since the wireless communication terminal 1 is the setup terminal (corresponding to step S102) and the terminal desiring to join is tentatively determined to be a PIN code display terminal (corresponding to step S103), the setup terminal transmits a beacon in which "Display" and "Keypad" are set in Selected Registrar Config Methods and "Default" is set in Device Password ID. Thereafter, the setup terminal iteratively transmits the beacon at a given timing when the beacon is to be transmitted (corresponding to step S104).

When the setup terminal receives a probe request (corresponding to step S106), since the Config Methods of the probe request includes both "Display" and "Keypad" (corresponding to steps S107 and S108) and the Device Password ID is "Registrar-specified," the setup terminal is employed as a PIN code display terminal (step corresponding to S109).

Since the employed PIN code display terminal is the setup terminal (corresponding to step 113), the setup terminal transmits a probe response in which "Display" and "Keypad" are set in Selected Registrar Config Methods and "Registrar-specified" is set in Device Password ID, to the terminal desiring to join as the probe request transmission source (corresponding to step S114).

Then, the setup terminal performs transmission and reception of various EAP messages with the terminal desiring to join. When registration is initiated by receiving an EAP-Response (M1) (corresponding to step S115), the setup terminal generates and displays a PIN code (corresponding to step S116). The setup terminal then performs registration (corresponding to step S121), and terminates setup by the PIN scheme when the registration is terminated.

Figure 7:
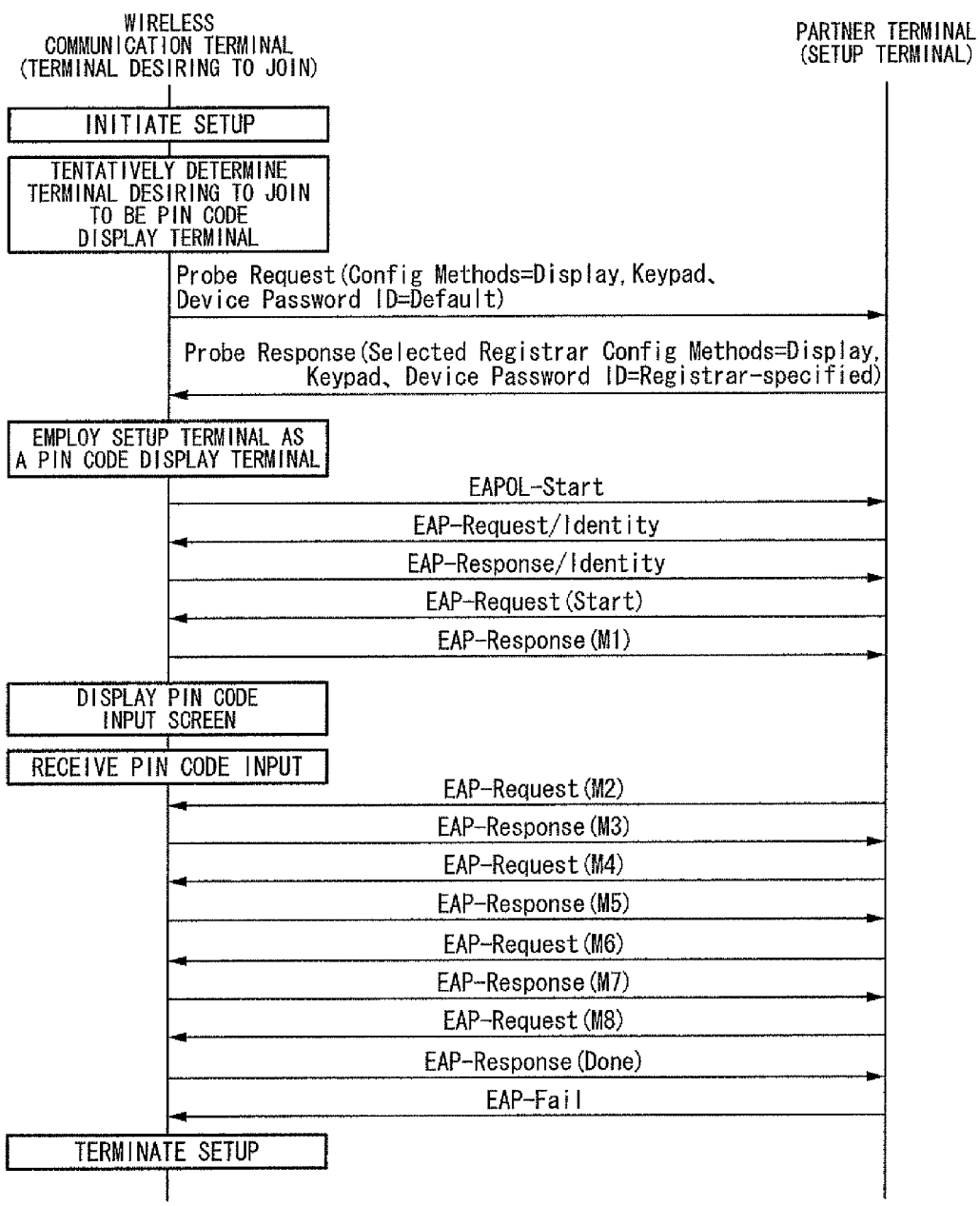
FIG. 7 is a sequence diagram showing operation of a terminal desiring to join according to the first embodiment of the present invention.

FIG. 7 shows an example of operation of the terminal desiring to join. When setup is initiated, the terminal desiring to join, for example, tentatively determines the terminal desiring to join to be a PIN code display terminal (corresponding to step S101). Since the wireless communication terminal 1 is the terminal desiring to join (corresponding to step S102) and the terminal desiring to join is tentatively determined to be a PIN code display terminal (corresponding to step S130), the terminal desiring to join transmits a probe request in which "Display" and "Keypad" are set in Config Methods and "Default" is set in Device Password ID (corresponding to step S132).

When the terminal desiring to join receives a probe response (corresponding to step S133), since the Config Methods in the probe response includes both the "Display" and "Keypad" (corresponding to steps S134 and S135) and the Device Password ID is "Registrar-specified," the terminal desiring to join employs the setup terminal as a PIN code display terminal (corresponding to step S136).

Then, the terminal desiring to join performs transmission and reception of various EAP messages with the setup terminal. When the registration is initiated by transmitting an EAP-Response (M1) (corresponding to step S140), since the terminal desiring to join has employed the setup terminal as the PIN code display terminal (corresponding to step S141), the terminal desiring to join displays a PIN code input screen (corresponding to step S143) and waits for the PIN code to be input from a user (corresponding to step S144). When the PIN code is input, the terminal desiring to join performs registration (corresponding to step S145), and terminates the setup by the PIN scheme when the registration is terminated.

For comparison with the present embodiment, operations of a conventional setup terminal and a conventional terminal desiring to join will be described. FIG. 16 shows operation of the conventional setup terminal. The setup terminal determines, for example, the terminal desiring to join to be a PIN code display terminal when setup is initiated. The setup terminal transmits a beacon in which "Display" and "Keypad" are set in Selected Registrar Config Methods and "Default" is set in Device Password ID. Thereafter, the setup terminal iteratively transmits the beacon at a given timing when the beacon is to be transmitted.

The setup terminal receives a probe request, but the setup terminal does not change the determined PIN code display terminal even when the Device Password ID in the probe request is "Registrar-specified," i.e., the terminal desiring to join desires the setup terminal to be a PIN code display terminal. Thereby, even when registration is initiated by receiving an EAP-Response (M1), the setup terminal displays a PIN code input screen and waits for PIN code to be input from a user since the setup terminal is not the display terminal.

Meanwhile, the terminal desiring to join desiring the setup terminal to be the PIN code display terminal displays a PIN code input screen and waits for the PIN code to be input from the user after registration is initiated by transmitting an EAP-Response (M1). Thus, since both the setup terminal and the terminal desiring to join operate as the input terminal rather than the PIN code display terminal, the registration fails. The registration is iteratively performed and the setup fails due to timeout.

FIG. 17 shows operation of the conventional terminal desiring to join. When setup is initiated, the terminal desiring to join, for example, determines the terminal desiring to join to be a PIN code display terminal. The joining terminal transmits a probe request in which "Display" and "Keypad" are set in Config Methods and "Default" is set in Device Password ID.

The terminal desiring to join receives a probe response, but does not change the determined PIN code display terminal even when the Device Password ID in the probe response is "Registrar-specified," i.e., the setup terminal desires the setup terminal to be the PIN code display terminal. Thereby, even when registration is initiated by transmitting an EAP-Response (M1), the terminal desiring to join generates and displays the PIN code since the terminal desiring to join is the display terminal.

Meanwhile, the setup terminal desiring the setup terminal to be a PIN code display terminal generates and displays a PIN code after registration has been initiated by receiving the EAP-Response (M1). Thus, since both the setup terminal and the terminal desiring to join operate as the PIN code display terminal, the registration fails. The registration is iteratively performed and the setup fails due to timeout.

In a conventional art, when the WPS is applied in the ad hoc mode and the setup is performed by a PIN scheme, if a PIN code display terminal determined by one of the setup terminal and the terminal desiring to join coincides with a PIN code display terminal desired by the other, the setup is successful. However, if the PIN code display terminal determined by the one of the setup terminal and the terminal desiring to join does not coincide with the PIN code display terminal desired by the other, the setup fails as described above.

On the other hand, in the present embodiment, the setup terminal and the terminal desiring to join exchange information on presence or absence of a display unit and an input unit, and the PIN code display terminal is determined in consideration of the display and input capabilities of the partner and a terminal desired to be a PIN code display terminal by the partner. In particular, even when a terminal desired to be a PIN code display terminal by the wireless communication terminal 1 differs from the terminal desired to be a PIN code display terminal by the partner, a terminal playing a role of the PIN code display terminal is determined according to a partner's intention. Accordingly, it is possible to reduce failure of a connection setup according to wireless communication and increase user convenience by determining the role of a display terminal for displaying identification information for an indication of a wireless network.

Furthermore, as the values stored in the Config Methods of the beacon, the probe response, and the probe request, another setup means supported by the wireless communication terminal 1 (e.g., "push button" (push button scheme)) may be recorded in addition to values specified in a flow.

Second Embodiment

Next, a second embodiment of the present invention will be described. A wireless communication terminal according to the present embodiment has the same configuration as that shown in FIG. 1. When a terminal desiring to join has transmitted a probe request in a state in which a plurality of terminals belonging to the same ad hoc network have transmitted beacons, in Non-patent Document 2, the terminal which finally transmitted beacon is set to transmit a probe response. Thereby, when the terminal which finally transmitted beacon is not a setup terminal, the terminal desiring to join cannot perform a setup with the setup terminal.

In the present embodiment, even when a joining terminal other than the setup terminal performing the setup with the terminal desiring to join transmits a probe response, the joining terminal notifying the setup terminal of a terminal determined to be a terminal playing a role of a PIN code display terminal allows the setup to be performed between the terminal desiring to join and the setup terminal.

Figure 8:
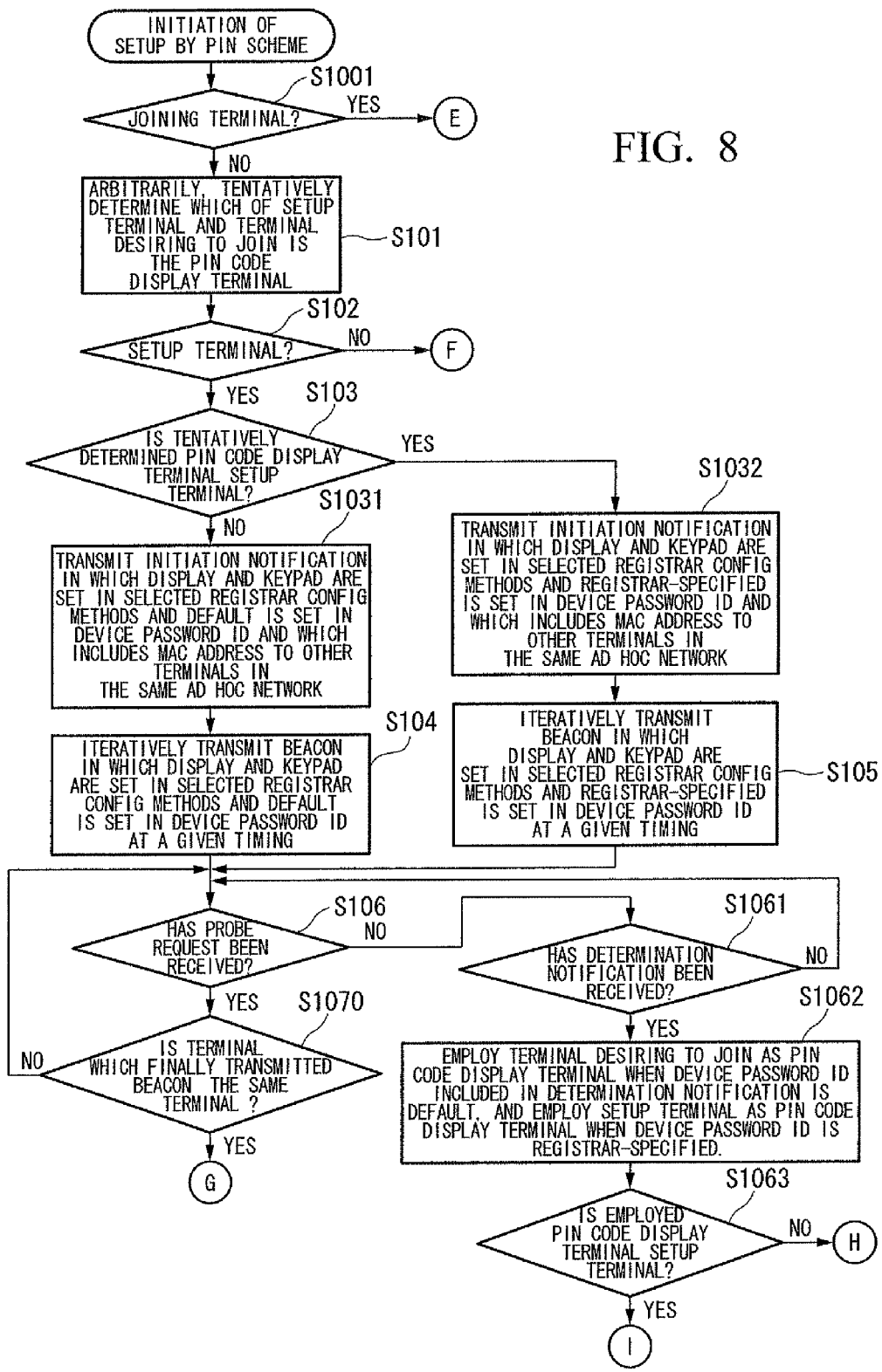
FIG. 8 is a flowchart showing a procedure of operation of a wireless communication terminal according to a second embodiment of the present invention.
Figure 9:
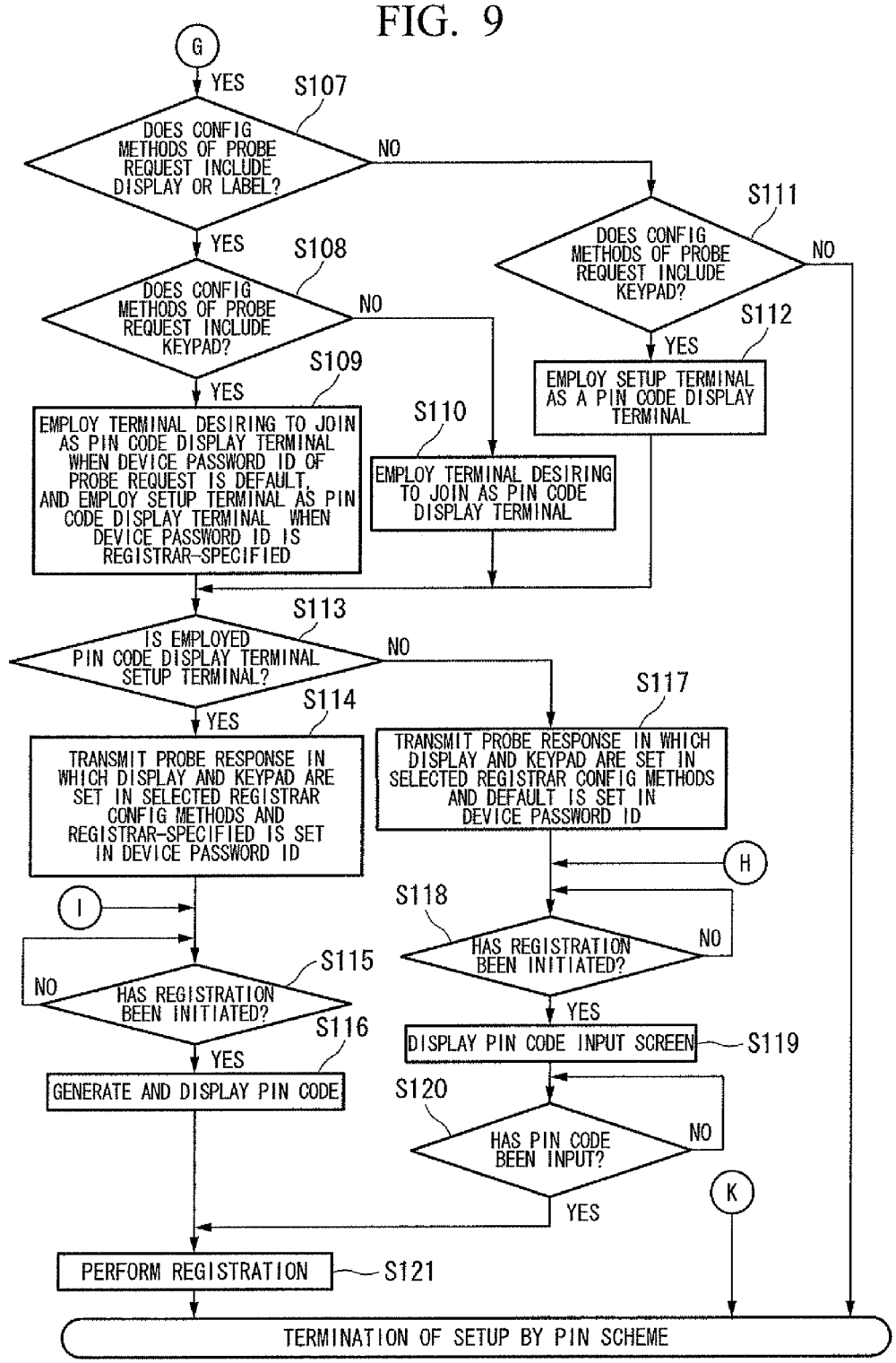
FIG. 9 is a flowchart showing a procedure of operation of the wireless communication terminal according to the second embodiment of the present invention.

FIGS. 8 and 9 show a setup procedure by a PIN scheme, and mainly show an operation procedure in the setup terminal. An overview of the procedure shown in FIGS. 8 and 9 is as follows:

(1) It is tentatively determined which of the setup terminal and the terminal desiring to join plays the role of the display terminal for displaying a PIN code.

(2) An initiation notification in which values according to content of the tentative determination and a MAC address of the setup terminal are set is transmitted to the joining terminal in an ad hoc network.

(3) Values according to the content of the tentative determination are set in a beacon, which is then iteratively transmitted.

(4) When a probe request transmitted from the terminal desiring to join is received, the same operation as in FIGS. 3 and 4 is performed.

(5) When the probe request is not received but a determination notification is received, either of the setup terminal and the terminal desiring to join is employed as the PIN code display terminal according to a value of the Device Password ID included in the determination notification. The determination notification is a message transmitted from a joining terminal having received the probe request from the terminal desiring to join and having determined a terminal playing the role of the display terminal, in order to notify that fact.

(6) Generation and display of the PIN code or reception of a PIN code input is performed according to the content of employment.

Hereinafter, FIGS. 8 and 9 will be described in detail. Further, a setup terminal operating according to the procedure shown in FIGS. 8 and 9 is the wireless communication terminal 1 shown in FIG. 1.

First, the determination unit 11 determines whether the wireless communication terminal 1 is a joining terminal (step S1001). Information for identifying whether the wireless communication terminal 1 is a setup terminal, a joining terminal, or a terminal desiring to join is stored in the storage unit 15, and in step S1001, the determination is performed based on this information. When the wireless communication terminal 1 was a joining terminal, the process proceeds to step S150 in FIG. 12. When the wireless communication terminal 1 was not a joining terminal, the process proceeds to step S101. The process in steps S101 to S103 is the same as in FIG. 3.

When, in step S103, the terminal playing the role of the display terminal tentatively determined in step S101 is not the setup terminal, the transmission unit 16 transmits an initiation notification in which "Display" and "Keypad" are set in Selected Registrar Config Methods and "Default" is set in Device Password ID and which includes the MAC address of the wireless communication terminal 1 (step S1031). The initiation notification is transmitted to other terminals in the same ad hoc network by broadcast or by setting all the terminals in the same ad hoc network as destinations.

The transmission unit 16 then iteratively transmits a beacon in which "Display" and "Keypad" are set in Selected Registrar Config Methods and "Default" is set in Device Password ID at a given timing (step S104).

When, in step S103, the terminal playing the role of the display terminal tentatively determined in step S101 is the setup terminal, the transmission unit 16 transmits an initiation notification in which "Display" and "Keypad" are set in Selected Registrar Config Methods and "Registrar-specified" is set in Device Password ID and which includes the MAC address of the wireless communication terminal 1 (step S1032). This initiation notification is transmitted to other terminals in the same ad hoc network by broadcast or by setting all the terminals in the same ad hoc network as destinations.

The transmission unit 16 then iteratively transmits a beacon in which "Display" and "Keypad" are set in Selected Registrar Config Methods and "Registrar-specified" is set in Device Password ID at a given timing (step S105).

The determination unit 11 then determines whether a probe request has been received (step S106). When the probe request is received, the determination unit 11 determines whether the terminal which finally transmitted beacon is the wireless communication terminal 1 (step S1070).

When the terminal which finally transmitted beacon is not the wireless communication terminal 1, the determination in step S106 is performed again. When the terminal which finally transmitted beacon is the wireless communication terminal 1, the process proceeds to step S107. The process in step S107 to S121 is the same as in FIGS. 3 and 4.

When, in step S106, the probe request has not been received, the determination unit 11 determines whether a determination notification has been received (step S1061). When the determination notification has not been received, the determination in step S106 is performed again. When the determination notification has been received, the determination unit 11 determines that the terminal desiring to join is employed as the PIN code display terminal when the Device Password ID in the determination notification is "Default," and the setup terminal is employed as the PIN code display terminal when the Device Password ID is "Registrar-specified," and records the result of the determination in the storage unit 15 (step S1062).

The determination unit 11 then determines whether the PIN code display terminal employed in step S1062 is the setup terminal (step S1063). When the employed PIN code display terminal is the setup terminal, the process proceeds to step S115. When the employed PIN code display terminal is not the setup terminal, the process proceeds to step S118. Therefore, when the determination notification has been received, the setup terminal determines the PIN code display terminal according to the content of the determination notification, and operates as the PIN code display terminal or the PIN code input terminal.

Figure 10:
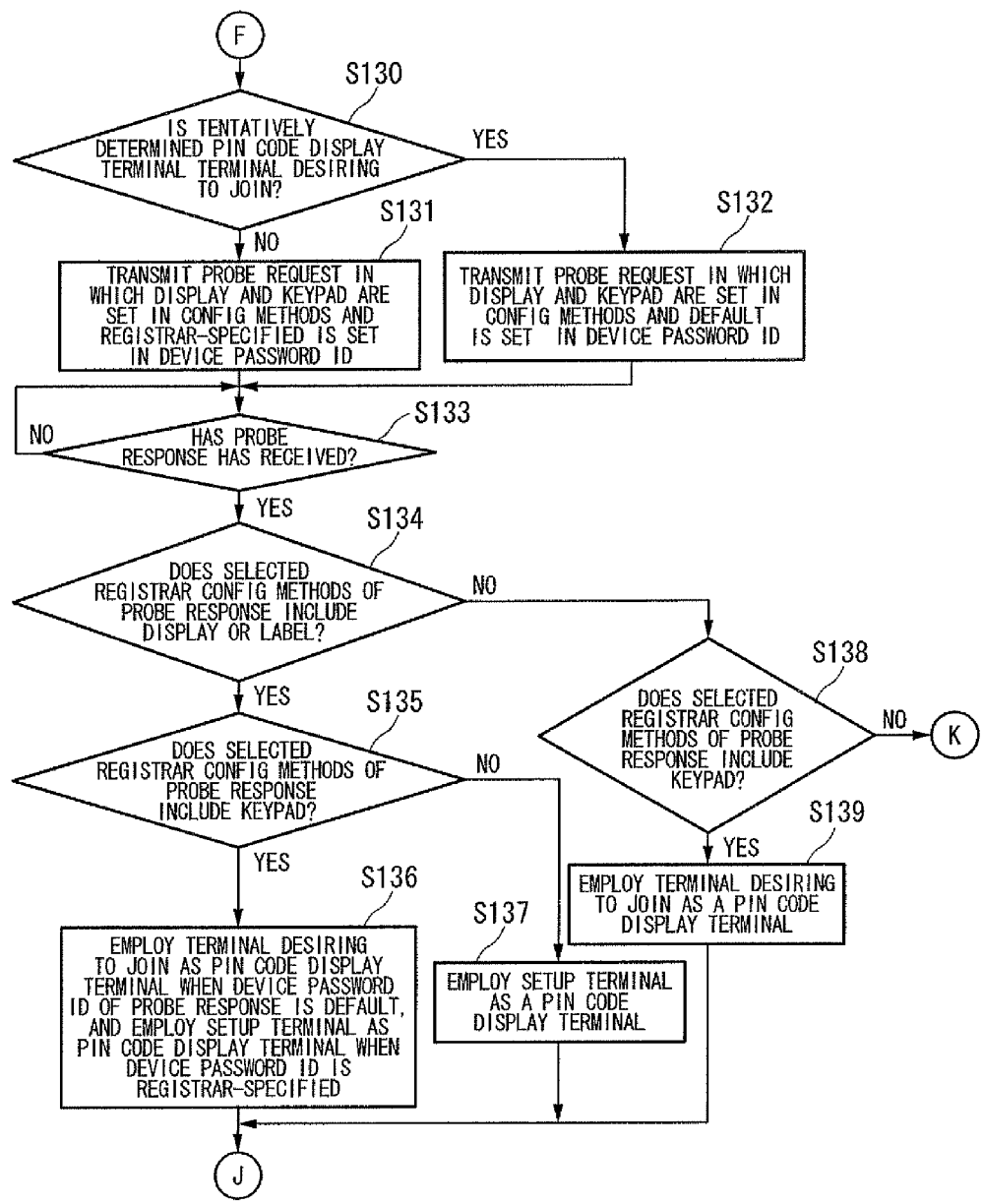
FIG. 10 is a flowchart showing a procedure of operation of the wireless communication terminal according to the second embodiment of the present invention.
Figure 11:
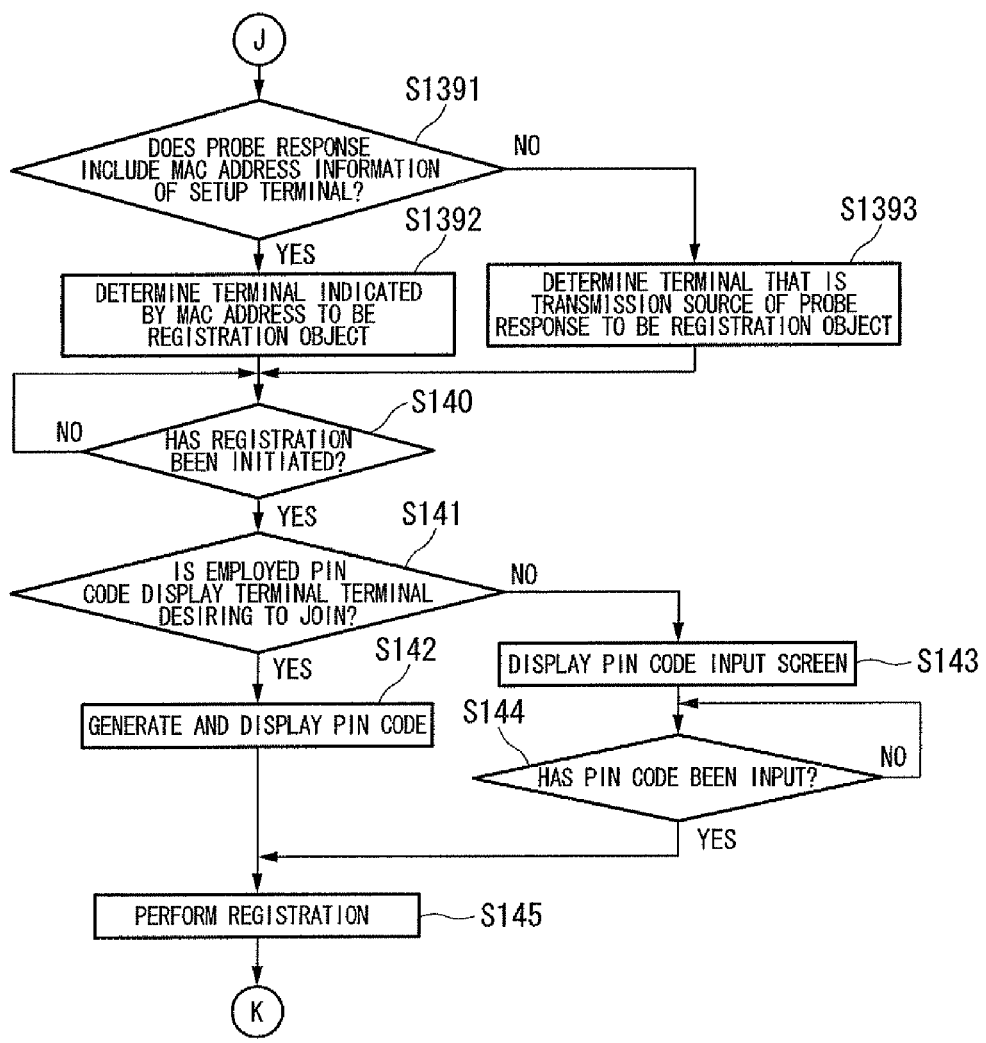
FIG. 11 is a flowchart showing a procedure of operation of the wireless communication terminal according to the second embodiment of the present invention.

FIGS. 10 and 11 show a setup procedure by a PIN scheme, and mainly show an operation procedure in the terminal desiring to join. An overview of the procedure shown in FIGS. 10 and 11 is as follows:

(1) It is tentatively determined which of the setup terminal and the terminal desiring to join plays the role of the display terminal for displaying PIN code.

(2) Values according to content of the tentative determination are set in a probe request, which is then transmitted.

(3) A probe response transmitted from another terminal is received and, when the other terminal is capable of either displaying or inputting the PIN code, either of the setup terminal and the terminal desiring to join is employed as the PIN code display terminal according to the value of the Device Password ID included in the probe response.

(4) When information indicating a MAC address of the setup terminal is included in the probe response, a terminal having the MAC address (setup terminal) is determined to be a registration object, and when the information indicating the MAC address of the setup terminal is not included in the probe response, a terminal that is the probe response transmission source is determined to be the registration object.

(5) Generation and display of the PIN code or reception of PIN code input is performed according to the content of employment.

Hereinafter, FIGS. 10 and 11 will be described in detail. Further, a terminal desiring to join operating according to the procedure shown in FIGS. 10 and 11 is the wireless communication terminal 1 shown in FIG. 1. The process in steps S130 to S139 is the same as in FIG. 5.

Subsequent to steps S136, S137 and S139, the determination unit 11 determines whether a MAC address of the setup terminal is included in the probe response received from another terminal (corresponding to step S133) (step S1391). The probe response includes a field in which the MAC address of the setup terminal is stored, and in step S1391, a determination as to whether a value is stored in the field is made.

When the MAC address of the setup terminal is included in the probe response, the determination unit 11 determines the setup terminal indicated by the MAC address to be the registration object (setup partner) (step S1392). When the MAC address of the setup terminal is not included in the probe response, the determination unit 11 determines the terminal that is the probe response transmission source to be the registration object (setup partner) (step S1393).

Subsequent to steps S1392 and S1393, the process proceeds to step S140. The process in steps S140 to S145 is the same as in FIG. 4.

Figure 12:
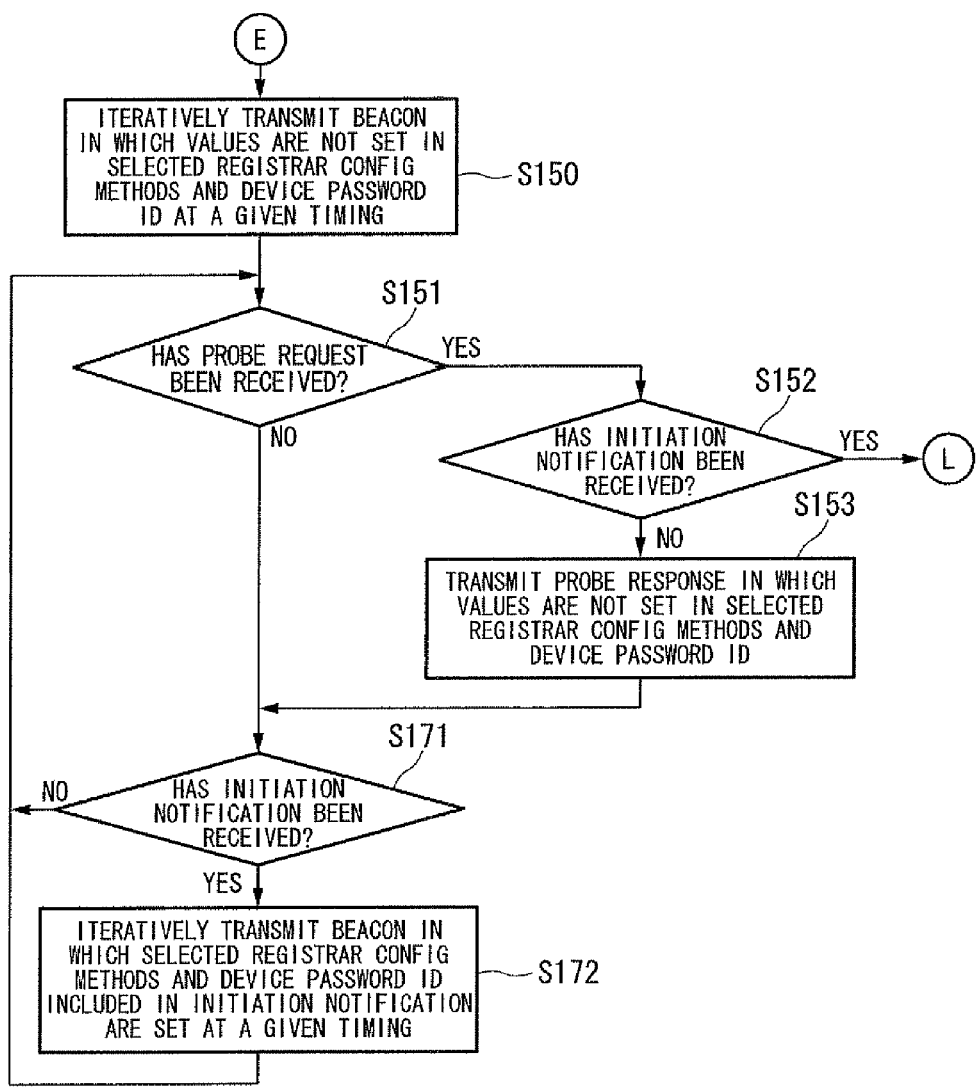
FIG. 12 is a flowchart showing a procedure of operation of the wireless communication terminal according to the second embodiment of the present invention.
Figure 13:
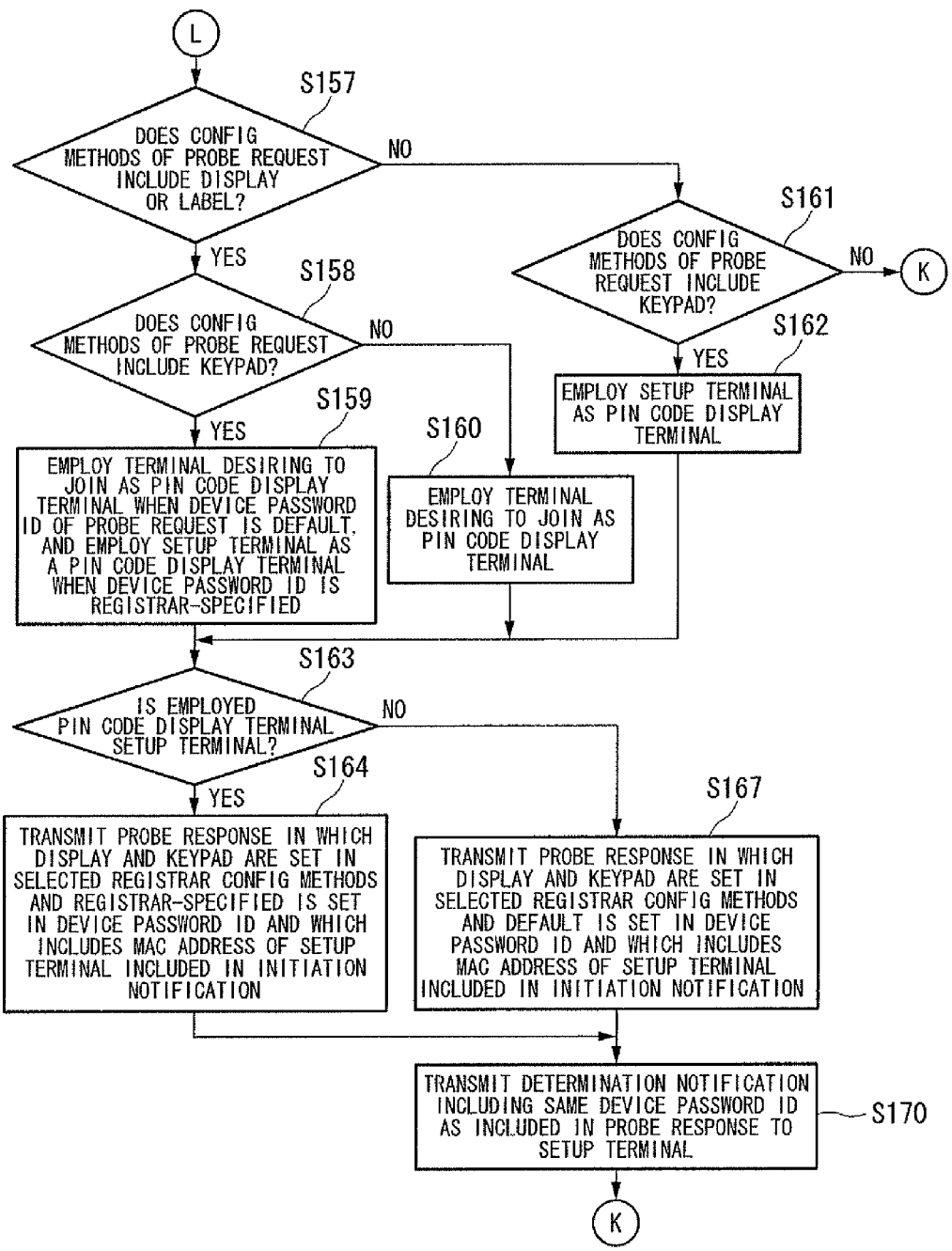
FIG. 13 is a flowchart showing a procedure of operation of the wireless communication terminal according to the second embodiment of the present invention.

FIGS. 12 and 13 show a setup procedure by a PIN scheme, and mainly show an operation procedure in a joining terminal. An overview of the procedure shown in FIGS. 12 and 13 is as follows:

(1) When an initiation notification transmitted from the setup terminal is received, a beacon is transmitted using information in the initiation notification.

(2) When a probe request from the terminal desiring to join is received after the initiation notification has been received, and the terminal desiring to join is capable of either displaying or inputting the PIN code, a PIN code display terminal is employed according to a value of the Device Password ID included in the probe request.

(3) A probe response is transmitted to the terminal desiring to join as the probe request transmission source according to the content of employment.

(4) A determination notification including the same Device Password ID as that included in the probe response is transmitted to the setup terminal.

Hereinafter, FIGS. 12 and 13 will be described in detail. Further, a joining terminal operating according to the procedure shown in FIGS. 12 and 13 is the wireless communication terminal 1 shown in FIG. 1.

The transmission unit 16 iteratively transmits a beacon in which values are not set in Selected Registrar Config Methods and Device Password ID at a given timing (step S150).

The determination unit 11 then determines whether a probe request has been received (step S151). When the probe request has not been received, the process proceeds to step S171. When the probe request has been received, the determination unit 11 determines whether an initiation notification has been received prior to receipt of the probe request (step S152).

When the initiation notification has not been received prior to the receipt of the probe request, the transmission unit 16 transmits a probe response in which values are not set in Selected Registrar Config Methods and Device Password ID to the terminal desiring to join as the probe request transmission source (step S153).

The determination unit 11 then determines whether the initiation notification has been received (step S171).

When the initiation notification has not been received, the process proceeds to step S151. When the initiation notification has been received, the transmission unit 16 iteratively transmits a beacon in which the values of the Selected Registrar Config Methods and the Device Password ID included in the initiation notification are set in Selected Registrar Config Methods and Device Password ID, respectively, at a given timing (step S172). The process then proceeds to step S151.

When, in step S152, the initiation notification has been received, the process proceeds to step S157. A process in steps S157 to S162 is the same as the process in steps S107 to S112 of FIG. 3. In steps S157 to S162, the determination unit 11 determines a terminal playing the role of the PIN code display terminal based on information of a terminal desired to be the PIN code display terminal by the terminal desiring to join or information of display and input capabilities of the terminal desiring to join.

Subsequent to steps S159, S160 and S162, the determination unit 11 determines whether the PIN code display terminal employed in any one of steps S159, S160 and S162 is a setup terminal (step S163). When the employed PIN code display terminal is the setup terminal, the transmission unit 16 transmits a probe response in which the "Display" and "Keypad" included in the initiation notification from the setup terminal are set in Selected Registrar Config Methods and "Registrar-specified" is set in Device Password ID and which includes a MAC address of the setup terminal included in the initiation notification, to the terminal desiring to join as the probe request transmission source (step S164). Accordingly, the terminal desiring to join is notified that the setup terminal is determined to be the PIN code display terminal, and of the MAC address of the setup terminal.

When the employed PIN code display terminal is not a setup terminal, the transmission unit 16 transmits a probe response in which the "Display" and "Keypad" included in the initiation notification from the setup terminal are set in Selected Registrar Config Methods and "Default" is set in Device Password ID and which a MAC address of the setup terminal included in the initiation notification, to the terminal desiring to join as the probe request transmission source (step S167). Accordingly, the terminal desiring to join is notified that the terminal desiring to join is determined to be the PIN code display terminal, and of the MAC address of the setup terminal.

Subsequent to steps S164 and S167, the transmission unit 16 transmits a determination notification in which the same value as the value of the Device Password ID included in the probe response transmitted in steps S164 and S167 is set in Device Password ID, to the setup terminal (step S170). Accordingly, the setup terminal is notified of information of a terminal determined to be the PIN code display terminal.

Figure 14:
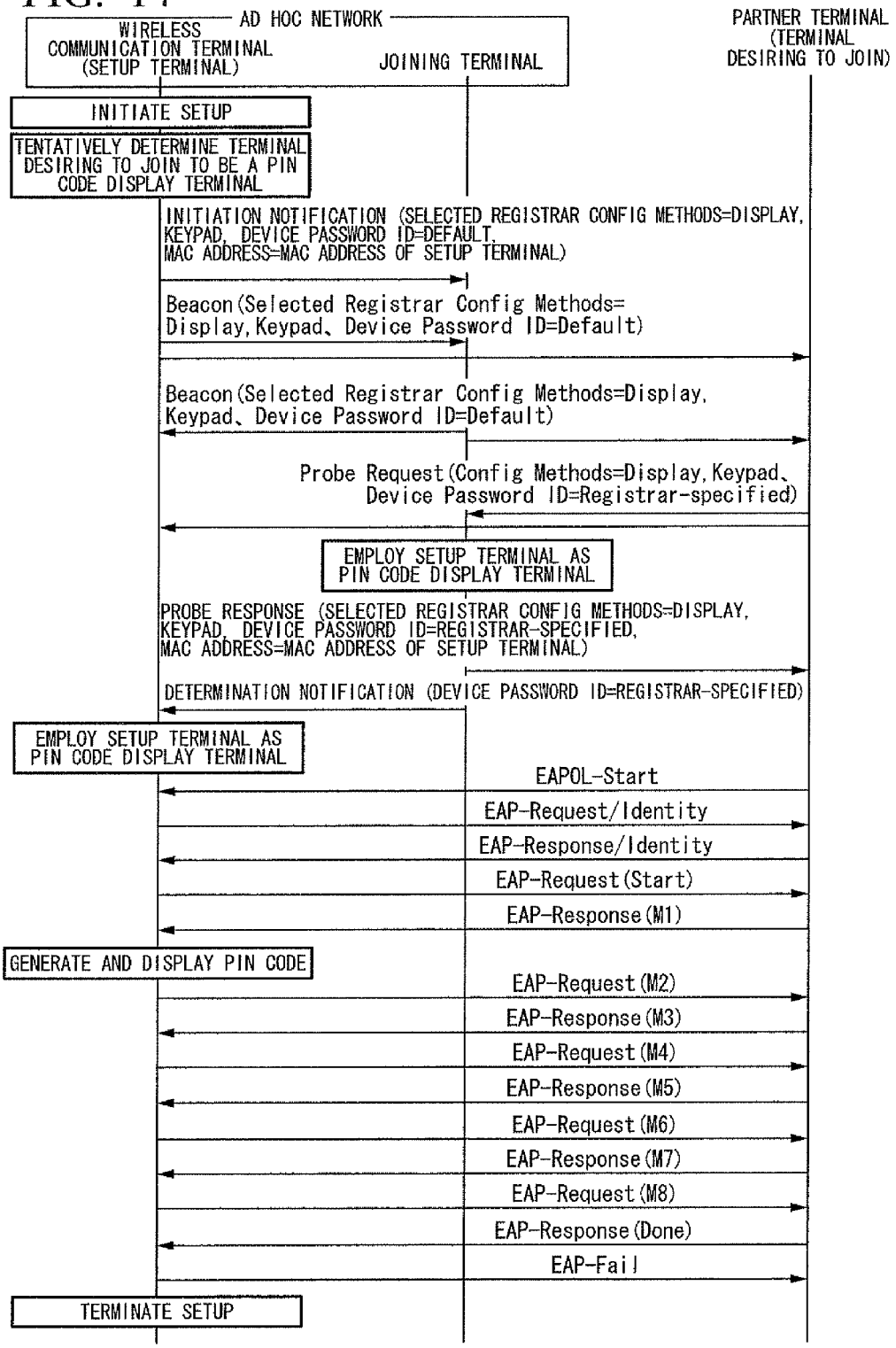
FIG. 14 is a sequence diagram showing operation of a setup terminal according to the second embodiment of the present invention.

FIG. 14 shows an example of operation of the setup terminal. When setup is initiated, the setup terminal, for example, tentatively determines the terminal desiring to join rather than the joining terminal (corresponding to step S1001) to be the PIN code display terminal (corresponding to step S101). Since the wireless communication terminal 1 is the setup terminal (corresponding to step S102) and the terminal desiring to join is tentatively determined to be the PIN code display terminal (corresponding to step S103), an initiation notification in which "Display" and "Keypad" are set in Selected Registrar Config Methods and "Default" is set in Device Password ID and which includes the MAC address of the wireless communication terminal 1 is transmitted (corresponding to step S1031). The setup terminal then transmits a beacon. Thereafter, the setup terminal iteratively transmits the beacon at a given timing when the beacon is to be transmitted (corresponding to step S104).

Meanwhile, when setup is initiated, a joining terminal transmits a beacon in which Selected Registrar Config Methods and Device Password ID are not set since the wireless communication terminal 1 is a joining terminal (corresponding to step S1001). Thereafter, the joining terminal iteratively transmits the beacon at a given timing when the beacon is to be transmitted (corresponding to step S150).

When the joining terminal receives the initiation notification (corresponding to step S171), the joining terminal transmits a beacon in which "Display" and "Keypad" of the Selected Registrar Config Methods and "Default" of the Device Password ID included in the initiation notification are set. Thereafter, the joining terminal iteratively transmits the beacon at a given timing when the beacon is to be transmitted (corresponding to step S172).

When the joining terminal receives a probe request from the terminal desiring to join (corresponding to step S151), the joining terminal has already received the initiation notification (corresponding to step S152). Since the Config Methods of the probe request includes both "Display" and "Keypad" (corresponding to steps S157 and S158) and the Device Password ID is "Registrar-specified," the joining terminal employs the setup terminal as the PIN code display terminal (corresponding to step S159).

Since the employed PIN code display terminal is the setup terminal (corresponding to step S163), the joining terminal transmits a probe response in which "Display" and "Keypad" are set in Selected Registrar Config Methods and "Registrar-specified" is set in Device Password ID and which includes the MAC address of the setup terminal included in the received initiation notification, to the terminal desiring to join as the probe request transmission source (corresponding to step S164).

The probe request transmitted by the terminal desiring to join is received even by the setup terminal (corresponding to step S106), but since the terminal which finally transmitted beacon is not the setup terminal (corresponding to step S1070), the setup terminal does not transmit the probe response. After transmitting the probe response, the joining terminal transmits a determination notification in which "Registrar-specified" of the Device Password ID included in the probe response is set, to the setup terminal (corresponding to step S170).

The setup terminal receives the probe request, but since the terminal which finally transmitted beacon is not the setup terminal, the setup terminal does not process the probe request (corresponding to steps S106 and S1070). The setup terminal then receives the determination notification (corresponding to steps S106 and S1061), and since the Device Password ID included in the determination notification is "Registrar-specified," the setup terminal is employed as the PIN code display terminal (corresponding to step S1062).

Since the employed PIN code display terminal is the setup terminal (corresponding to step S1063), the setup terminal then performs transmission and reception of various EAP messages with the terminal desiring to join, and when registration is initiated by receiving an EAP-Response (M1) (corresponding to step S115), the setup terminal generates and displays a PIN code (corresponding to step S116). The setup terminal then performs registration (corresponding to step S121), and terminates the setup by the PIN scheme when the registration is terminated.

Figure 15:
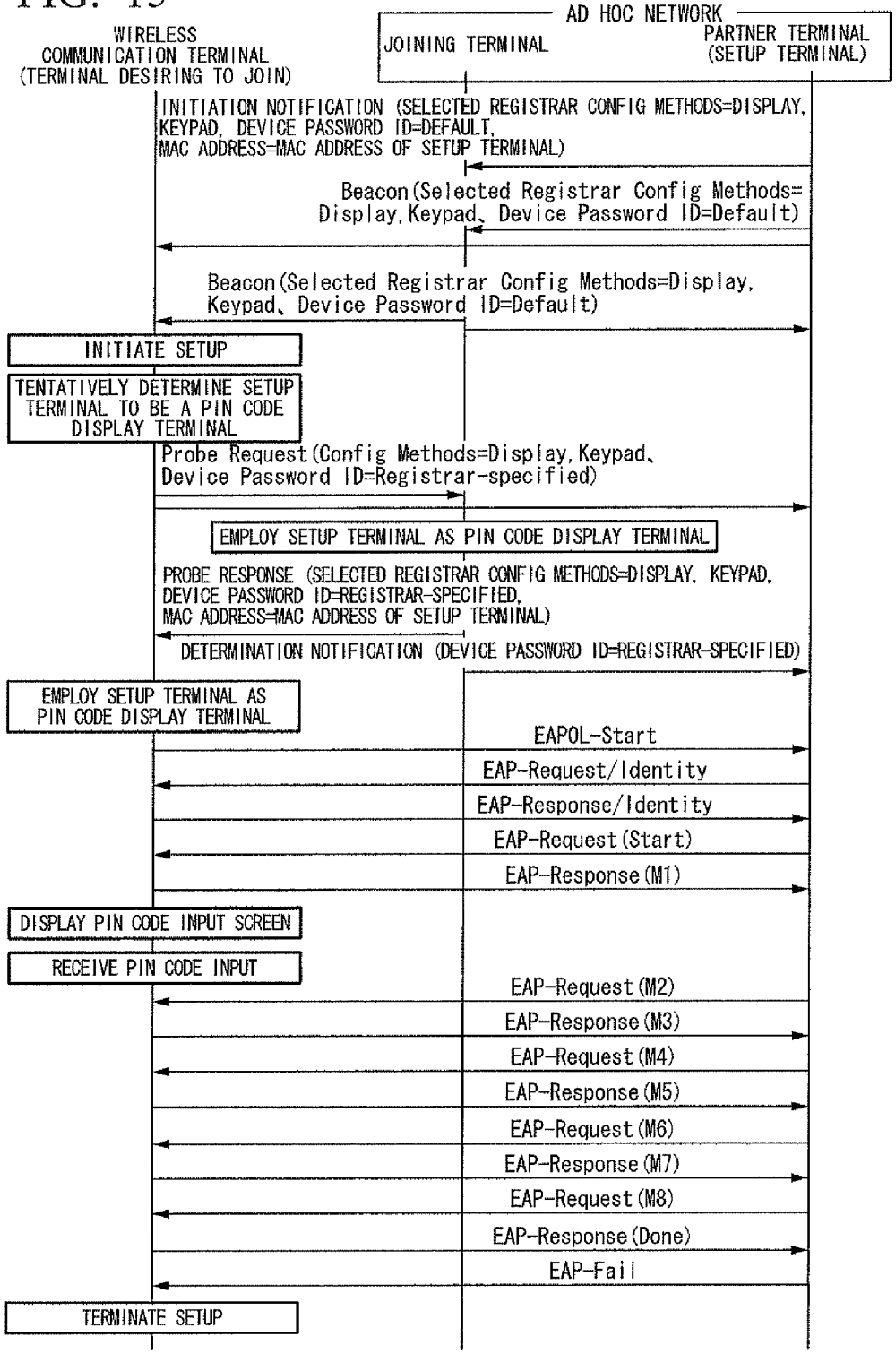
FIG. 15 is a sequence diagram showing operation of a terminal desiring to join according to the second embodiment of the present invention.

FIG. 15 shows an example of operation of the terminal desiring to join. When setup is initiated, the terminal desiring to join, for example, tentatively determines the setup terminal rather than the joining terminal (corresponding to step S1001) to be the PIN code display terminal (corresponding to step S101). Since the wireless communication terminal 1 is the terminal desiring to join (corresponding to step S102) and the setup terminal is tentatively determined to be the PIN code display terminal (step S130), the terminal desiring to join transmits a probe request in which "Display" and "Keypad" are set in Config Methods and "Registrar-specified" is set in a Device Password ID (corresponding to step S131).

When the terminal desiring to join receives a probe response (corresponding to step S133), the terminal desiring to join employs the setup terminal as the PIN code display terminal since the Selected Registrar Config Methods in the probe response includes both "Display" and "Keypad" (corresponding to steps S134 and S135) and the Device Password ID is "Registrar-specified" (corresponding to step S136).

Since the probe response includes information indicating the MAC address of the setup terminal (corresponding to step S1391), the terminal desiring to join determines a terminal (setup terminal) indicated by the MAC address to be a registration object (corresponding to step S1392).

Then, the terminal desiring to join performs transmission and reception of various EAP messages with the setup terminal, and when registration is initiated by transmitting an EAP-Response (M1) (corresponding to step S140), the terminal desiring to join displays a PIN code input screen (corresponding to step S143) and waits for the PIN code to be input from a user (corresponding to step S144) since the setup terminal is employed as the PIN code display terminal (corresponding to step S141). When the PIN code is input, the terminal desiring to join performs registration (corresponding to step S145), and terminates the setup by the PIN scheme when the registration is terminated.

As described above, in the present embodiment, the joining terminal receives the probe request from the terminal desiring to join, determines the PIN code display terminal, and notifies the setup terminal of the determined display terminal. Accordingly, it is possible to reduce failure of a connection setup according to wireless communication and increase user convenience.

Further, as the values stored in the Selected Registrar Config Methods included in the beacon, the probe response, and the initiation notification, and the Config Methods included in the probe request, another setup means (e.g., push button (push button scheme)) supported by the wireless communication terminal 1 may be recorded in addition to values specified in a flow.

While the preferred embodiments of the present invention have been described, the present invention is not limited to the embodiments. Addition, omission, substitution, and other modification may be made to the configuration of the present invention without departing from the spirit and scope of the present invention. The present invention is not limited by the description and is limited only by the claims.

According to the present invention, the wireless communication terminal determines which of the terminal desiring to join and the setup terminal plays the role of the display terminal based on the information on presence or absence of a display unit and an input unit of another wireless communication terminal, which is a communication partner, and the desired display terminal information or the tentative display terminal information, thereby reducing failure of the connection setup according to wireless communication by determining the role of the display terminal for displaying identification information for an indication of a wireless network.

What is claimed is:

1. A wireless communication terminal comprising:
    a tentative determination unit for performing a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network;
    a transmission unit for transmitting wireless data, the wireless data including tentative display terminal information indicating the result of the tentative determination and first information on presence or absence of a display unit of the wireless communication terminal and presence or absence of an input unit of the wireless communication terminal;
    a receiving unit for receiving response data transmitted from other wireless communication terminal having received the wireless data, the response data including desired display terminal information indicating the terminal playing the role of the display terminal and second information on presence or absence of a display unit and an input unit of the other wireless communication terminal having received the wireless data; and
    a determination unit for determining which of the terminal desiring to join and the setup terminal plays the role of the display terminal based on the desired display terminal information and the second information.

2. The wireless communication terminal according to claim 1,
    wherein the wireless communication terminal is the terminal desiring to join,
    the transmission unit transmits the wireless data to the setup terminal, and
    the receiving unit receives the response data from the setup terminal.

3. The wireless communication terminal according to claim 1, further comprising a display unit for performing display of information,
    wherein the display unit displays the identification information for an indication of the wireless network when the terminal playing the role of the display terminal determined by the determination unit is the wireless communication terminal.

4. A wireless communication terminal comprising:
    a receiving unit for receiving wireless data, the wireless data including tentative display terminal information indicating the result of a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit;
    a determination unit for determining which of the terminal desiring to join and the setup terminal plays the role of the display terminal based on the tentative display terminal information and the first information; and
    a transmission unit for transmitting response data to other wireless communication terminal having transmitted the wireless data, the response data including desired display terminal information indicating the determined terminal playing the role of the display terminal and second information on presence or absence of a display unit of the wireless communication terminal and presence or absence of an input unit of the wireless communication terminal.

5. The wireless communication terminal according to claim 4,
    wherein the wireless communication terminal is the setup terminal, the receiving unit receives the wireless data from the terminal desiring to join, and the transmission unit transmits the response data to the terminal desiring to join.

6. The wireless communication terminal according to claim 4, further comprising a display unit for performing display of information, wherein the display unit displays the identification information for an indication of the wireless network when the terminal playing the role of the display terminal determined by the determination unit is the wireless communication terminal.

7. A wireless communication terminal comprising:

a receiving unit for receiving first wireless data from a terminal desiring to join a wireless network, the first wireless data including tentative display terminal information indicating the result of a tentative determination as to which of the terminal desiring to join and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit of the terminal desiring to join, and receiving second wireless data including second information on presence or absence of a display unit and an input unit of the setup terminal from the setup terminal;

a determination unit for determining which of the terminal desiring to join and the setup terminal plays the role of the display terminal based on the tentative display terminal information and the first information; and a transmission unit for transmitting response data including desired display terminal information indicating the determined terminal playing the role of the display terminal and the second information to the terminal desiring to join, and transmitting notification data including the desired display terminal information to the setup terminal.

8. A wireless communication method comprising:

a tentative determination step of performing a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network;

a transmission step of transmitting wireless data, the wireless data including tentative display terminal information indicating the result of the tentative determination and first information on presence or absence of a display unit of the wireless communication terminal and presence or absence of an input unit of the wireless communication terminal;

a receiving step of receiving response data transmitted from other wireless communication terminal having received the wireless data, the response data including desired display terminal information indicating the terminal playing the role of the display terminal and second information on presence or absence of a display unit and an input unit of the other wireless communication terminal having received the wireless data; and a determination step of determining which of the terminal desiring to join and the setup terminal plays the role of the display terminal based on the desired display terminal information and the second information.

9. A wireless communication method comprising:

a receiving step of receiving wireless data, the wireless data including tentative display terminal information indicating the result of a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit;

a determination step of determining which of the terminal desiring to join and the setup terminal plays the role of the display terminal based on the tentative display terminal information and the first information; and a transmission step of transmitting response data to other wireless communication terminal having transmitted the wireless data, the response data including desired display terminal information indicating the determined terminal playing the role of the display terminal and second information on presence or absence of a display unit of the wireless communication terminal and presence or absence of an input unit of the wireless communication terminal.

10. A wireless communication method comprising:

a receiving step of receiving first wireless data from a terminal desiring to join a wireless network, the first wireless data including tentative display terminal information indicating the result of a tentative determination as to which of the terminal desiring to join and a setup terminal plays a role of a display terminal for displaying identification information for an indication of the wireless network, the setup terminal being a partner with which the terminal desiring to join performs a connection setup to join the wireless network, and first information on presence or absence of a display unit and an input unit of the terminal desiring to join, and receiving second wireless data including second information on presence or absence of a display unit and an input unit of the setup terminal from the setup terminal;

a determination step of determining which of the terminal desiring to join and the setup terminal plays the role of the display terminal based on the tentative display terminal information and the first information; and a transmission step of transmitting response data to the terminal desiring to join, the response data including desired display terminal information indicating the determined terminal playing the role of the display terminal and the second information, and transmitting notification data including the desired display terminal information to the setup terminal.

11. A wireless communication system comprising a first wireless communication terminal and a second wireless communication terminal that perform wireless communication, wherein the first wireless communication terminal comprises:

a tentative determination unit for performing a tentative determination as to which of a terminal desiring to join a wireless network and a setup terminal plays a role of a display terminal for displaying identification information for an indication of the wireless network, the setup terminal being a partner with which the terminal desiring to join performs a connection setup to join the wireless network;

a first transmission unit for transmitting wireless data, the wireless data including tentative display terminal information indicating the result of the tentative determination and first information on presence or absence of a display unit of the first wireless communication terminal and presence or absence of an input unit of the first wireless communication terminal;

a first receiving unit for receiving response data transmitted from the second wireless communication terminal having received the wireless data, the response data including desired display terminal information indicating the terminal playing the role of the display terminal and second information on presence or absence of a display unit and an input unit of the second wireless communication terminal having received the wireless data; and a first determination unit for determining which of the terminal desiring to join and the setup terminal plays the role of the display terminal based on the desired display terminal information and the second information, and the second wireless communication terminal comprises:

a second receiving unit for receiving the wireless data;

a second determination unit for determining which of the terminal desiring to join and the setup terminal plays the role of the display terminal based on the tentative display terminal information and the first information; and a second transmission unit for transmitting response data to the first wireless communication terminal, the response data including desired display terminal information indicating the determined terminal playing the role of the display terminal and the second information on presence or absence of a display unit of the second wireless communication terminal and presence or absence of an input unit of the second wireless communication terminal.

12. A wireless communication system comprising a terminal desiring to join a wireless network, a setup terminal that is a partner with which the terminal desiring to join performs a connection setup to join the wireless network, and a joining terminal that has joined the wireless network and is different from the setup terminal, wherein the terminal desiring to join comprises:

a tentative determination unit for performing a tentative determination as to which of the terminal desiring to join and the setup terminal plays a role of a display terminal for displaying identification information for an indication of the wireless network;

a first transmission unit for transmitting first wireless data, the first wireless data including tentative display terminal information indicating the result of the tentative determination and first information on presence or absence of a display unit of the terminal desiring to join and presence or absence of an input unit of the terminal desiring to join;

a first receiving unit for receiving response data transmitted from the joining terminal, the response data including desired display terminal information indicating the terminal playing the role of the display terminal and second information on presence or absence of a display unit and an input unit of the setup terminal having received the first wireless data; and a first determination unit for determining which of the terminal desiring to join and the setup terminal plays the role of the display terminal based on the desired display terminal information and the second information, the joining terminal comprises:

a second receiving unit for receiving the first wireless data from the terminal desiring to join and receiving second wireless data including the second information from the setup terminal;

a second determination unit for determining which of the terminal desiring to join and the setup terminal plays the role of the display terminal based on the tentative display terminal information and the first information; and a second transmission unit for transmitting response data including the desired display terminal information indicating the determined terminal playing the role of the display terminal and the second information to the terminal desiring to join, and transmitting notification data including the desired display terminal information to the setup terminal, and the setup terminal comprises:

a third transmission unit for transmitting the second wireless data; and a third receiving unit for receiving the notification data.

* * * * *